United States Patent
Wilson et al.

(10) Patent No.: US 12,143,397 B2
(45) Date of Patent: *Nov. 12, 2024

(54) HOSTED AUTHORIZATION RESPONSE MANAGEMENT

(71) Applicant: ValiMail Inc., San Francisco, CA (US)

(72) Inventors: Ashley Duane Wilson, San Francisco, CA (US); Seth Joshua Blank, San Francisco, CA (US); Peter Martin Goldstein, San Francisco, CA (US)

(73) Assignee: ValiMail Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,874

(22) Filed: Jun. 1, 2023

(65) Prior Publication Data

US 2023/0388314 A1  Nov. 30, 2023

Related U.S. Application Data

(63) Continuation of application No. 17/328,753, filed on May 24, 2021, which is a continuation of application (Continued)

(51) Int. Cl.
*H04L 9/40* (2022.01)

(52) U.S. Cl.
CPC .......... *H04L 63/105* (2013.01); *H04L 63/101* (2013.01); *H04L 63/107* (2013.01); *H04L 63/20* (2013.01)

(58) Field of Classification Search
CPC ... H04L 63/105; H04L 63/101; H04L 63/107; H04L 63/20; H04L 63/0884

(Continued)

(56) References Cited

U.S. PATENT DOCUMENTS 7,123,974 B1  10/2006  Hamilton
7,742,603 B2   6/2010  Tengler et al.
(Continued)

FOREIGN PATENT DOCUMENTS

EP       1720123 A1      11/2006
WO   WO 2014/131058 A2    8/2014

OTHER PUBLICATIONS

European Patent Office, Extended European Search Report and Written Opinion, European Patent Application No. 21750125.3, Jan. 2, 2024, 8 pages.

(Continued)

*Primary Examiner* — Kambiz Zand
*Assistant Examiner* — Aubrey H Wyszynski
(74) *Attorney, Agent, or Firm* — Fenwick & West LLP

(57) ABSTRACT

A third-party server may maintain a list of named entity devices that belong to one or more roles in an application environment. The server may receive an authorization query from a policy consuming device. The authorization query may include an identity of a particular named entity device which sent a message to the policy consuming device and contextual metadata associated with the message. The server may determine that the particular named entity device belongs to one of the roles and filter the list based on the contextual metadata. The server may generate an interaction control list that includes the filtered list and transmit the interaction control list to the policy consuming device as a response to the authorization query. The interaction control list causes the policy consuming device to react to the message based on the interaction control list.

20 Claims, 11 Drawing Sheets

Related U.S. Application Data

No. 17/155,091, filed on Jan. 22, 2021, now Pat. No. 11,038,897.

(60) Provisional application No. 63/093,723, filed on Oct. 19, 2020, provisional application No. 62/964,624, filed on Jan. 22, 2020.

(58) Field of Classification Search
USPC .......................................................... 726/1
See application file for complete search history.

(56) References Cited

U.S. PATENT DOCUMENTS

| | | |
|---|---|---|
| 8,132,250 B2 | 3/2012 | Judge et al. |
| 8,438,079 B1 | 5/2013 | Nguyen et al. |
| 9,143,476 B2 | 9/2015 | Dreller et al. |
| 9,419,951 B1* | 8/2016 | Felsher ................. H04L 9/3249 |
| 9,646,496 B1 | 5/2017 | Miller |
| 9,686,073 B2 | 6/2017 | Goldstein |
| 9,762,618 B2 | 9/2017 | Goldstein |
| 9,774,586 B1 | 9/2017 | Roche et al. |
| 9,800,402 B2 | 10/2017 | Goldstein |
| 10,122,765 B1 | 11/2018 | Goldstein |
| 10,169,342 B1* | 1/2019 | Ben-Yair ............. G06F 16/9538 |
| 10,229,157 B2* | 3/2019 | Collins ............. G06F 16/24542 |
| 10,237,278 B1 | 3/2019 | Saylor et al. |
| 10,257,231 B2 | 4/2019 | Goldstein |
| 10,469,330 B1* | 11/2019 | Roth ....................... H04L 41/22 |
| 10,642,969 B2 | 5/2020 | James et al. |
| 10,897,485 B2 | 1/2021 | Goldstein |
| 10,992,716 B1* | 4/2021 | Cairney ................. H04L 63/20 |
| 11,038,897 B1* | 6/2021 | Wilson .................... H04L 63/20 |
| 11,171,939 B1 | 11/2021 | Blank et al. |
| 2004/0177120 A1 | 9/2004 | Kirsch |
| 2006/0253314 A1 | 11/2006 | Reznichenko et al. |
| 2006/0277259 A1 | 12/2006 | Murphy et al. |
| 2010/0082758 A1 | 4/2010 | Golan |
| 2012/0151486 A1 | 6/2012 | Owen et al. |
| 2013/0318602 A1 | 11/2013 | Devarapalli et al. |
| 2014/0047064 A1* | 2/2014 | Maturana ................. G06N 7/01 709/217 |
| 2014/0164281 A1 | 6/2014 | Balkir et al. |
| 2014/0244998 A1 | 8/2014 | Amenedo et al. |
| 2015/0188949 A1* | 7/2015 | Mahaffey ............ H04L 41/0894 726/1 |
| 2016/0142387 A1 | 5/2016 | Lockhart et al. |
| 2016/0162591 A1* | 6/2016 | Dokania ............... G06F 16/955 707/738 |
| 2016/0171509 A1 | 6/2016 | Fanous et al. |
| 2016/0205078 A1* | 7/2016 | James ................. H04L 61/4511 713/171 |
| 2016/0205097 A1 | 7/2016 | Yacoub et al. |
| 2016/0205106 A1 | 7/2016 | Yacoub et al. |
| 2016/0315969 A1 | 10/2016 | Goldstein |
| 2016/0352705 A1 | 12/2016 | Lockhart et al. |
| 2017/0012780 A1 | 1/2017 | Kaliski et al. |
| 2017/0034100 A1 | 2/2017 | Zink et al. |
| 2017/0083867 A1 | 3/2017 | Saxena et al. |
| 2017/0270128 A1* | 9/2017 | Smith ..................... G06F 16/78 |
| 2017/0324724 A1 | 11/2017 | Smith et al. |
| 2018/0048460 A1 | 2/2018 | Goldstein |
| 2018/0060601 A1 | 3/2018 | Kay et al. |
| 2018/0172799 A1 | 6/2018 | Meadow |
| 2018/0285977 A1 | 10/2018 | Cleary et al. |
| 2018/0302446 A1 | 10/2018 | Goldstein |
| 2018/0332065 A1 | 11/2018 | Gupta et al. |
| 2019/0014180 A1 | 1/2019 | Lawson et al. |
| 2019/0028832 A1 | 1/2019 | Speede |
| 2019/0149342 A1 | 5/2019 | Fynaardt et al. |
| 2019/0200228 A1 | 6/2019 | Adrangi et al. |
| 2019/0334884 A1 | 10/2019 | Ross et al. |
| 2020/0092257 A1* | 3/2020 | Goldstein ............... H04L 67/02 |
| 2020/0137081 A1 | 4/2020 | Goldstein |
| 2020/0296082 A1 | 9/2020 | Killoran et al. |
| 2021/0067559 A1 | 3/2021 | Coleman et al. |
| 2021/0092118 A1 | 3/2021 | Zahed |
| 2021/0092127 A1 | 3/2021 | Li et al. |
| 2021/0289001 A1* | 9/2021 | Wilson .................. H04L 63/101 |

OTHER PUBLICATIONS

United States Office Action, U.S. Appl. No. 17/328,759, filed Dec. 29, 2023, 23 pages.

Alagar et al., "Context-aware Trust-based Management of Vehicular Ad-hoc Networks (VANETs)", IEEE Computer Society, Aug. 10, 2015, 7 pages.

European Patent Office, European Search Report and Written Opinion, European Patent Application No. 21744185.6, Feb. 27, 2024, 11 pages.

Parikh et al., "Privacy-preserving Services in VAN ET with Misbehavior Detection", IEEE International Conference on Advance Networks and Telecommunication Systems, Dec. 17, 2017, 6 pages.

United States Office Action, U.S. Appl. No. 17/168,091, filed Feb. 27, 2024, 39 pages.

Wang et al., "Privacy-Preserving Cloud-Based Road Condition Monitoring with Source Authentication in VANETs", IEEE Transactions on Information Forensics and Security, Dec. 6, 2018, 12 pages.

Andersen, K. et al., "The Authenticated Received Chain (ARC) Protocol," Internet Engineering Task Force (IETF), Request for Comments: 8617, Jul. 2019, 35 pages, ISSN: 2070-1721.

Kucherawy, M. et al., "Domain-based Message Authentication, Reporting, and Conformance (DMARC)," Request for Comments: 7489, Mar. 2015, 73 pages, ISSN: 2070-1721.

PCT International Search Report and Written Opinion, PCT Application No. PCT/US2021/014481, May 3, 2021, 10 pages.

PCT International Search Report and Written Opinion, PCT Application No. PCT/US2021/014483, May 3, 2021, 10 pages.

U.S. Appl. No. 17/128,008, filed Dec. 19, 2020, ValiMail Inc.

U.S. Appl. No. 63/057,814, filed Jul. 28, 2020, ValiMail Inc.

Australian Intellectual Property Office, Examination Report, Australian Patent Application No. 2021209899, Jul. 6, 2023, 4 pages.

Lin, X. et al. "GSIS: A secure and privacy-preserving protocol for vehicular communications," *IEEE Transactions on vehicular technology*, Nov. 19, 2007, pp. 3442-3456.

PCT International Search Report and Written Opinion, PCT Application No. PCT/US2021/016674, May 24, 2021, 10 pages.

Rekik, M. et al. "Improved dual authentication and key management techniques in vehicular ad hoc networks," 14th International Conference on Computer Systems and Applications, Oct. 30, 2017, pp. 1133-1140.

Office Action, U.S. Appl. No. 17/168,091, filed Jul. 11, 2023, 35 pages.

Office Action, U.S. Appl. No. 17/328,753, filed Dec. 23, 2022, 7 pages.

European Patent Office, Extended European Search Report and Written Opinion, European Patent Application No. 21744189.8, Feb. 15, 2024, 7 pages.

European Patent Office, Extended European Search Report, European Patent Application No. 21206991.8, Apr. 28, 2022, 7 pages.

PCT International Search Report and Written Opinion, PCT Application No. PCT/US2021/014482, Aug. 27, 2021, 10 pages.

Russell, D. "Access Control for Dynamic Virtual Organizations." Electronic Proceedings of the UK EScience All Hands Meeting, Jan. 1, 2004, pp. 1-8.

United States Office Action, U.S. Appl. No. 18/320,917, filed Feb. 29, 2024, 11 pages.

United States Office Action, U.S. Appl. No. 17/155,089, filed Jun. 14, 2022, 13 pages.

United States Office Action, U.S. Appl. No. 17/371,718, filed Dec. 22, 2022, 6 pages.

* cited by examiner

HOSTED AUTHORIZATION RESPONSE MANAGEMENT

CROSS-REFERENCE TO RELATED APPLICATIONS

The present application is a continuation of U.S. patent application Ser. No. 17/328,753, filed on May 24, 2021, which is a continuation of U.S. patent application Ser. No. 17/155,091, filed on Jan. 22, 2021, now U.S. Pat. No. 11,038,897, which claims the benefit of U.S. Provisional Patent Application No. 62/964,624, filed on Jan. 22, 2020, and U.S. Provisional Patent Application No. 63/093,723, filed on Oct. 19, 2020, all of which are hereby incorporated by reference in their entirety.

TECHNICAL FIELD

The present disclosure generally relates to authentication and authorization in a network application and, more specifically, to delegated authentication and generating interaction control lists and recommendations.

BACKGROUND

In network communication, devices can communicate with virtually any other devices. As a result, a device in a network environment needs ways to authenticate another device to determine the identity of the device attempting to establish communications. Spoofing or impersonation has been a challenge for network environments. Systems that are vulnerable to spoofing could allow malicious entities to gain trust and inflict damage to the network environment. Major security breaches need to be prevented in advance in the areas of email, Internet of things (IoT), cloud computing, social media, virtual private networks, etc. When spoofing is prevented, organizations can determine with assurances that a device is what it claims to be and may in turn make determinations on how to treat the device.

A system administrator may determine how devices under the operation of the administrator may respond to other authenticated devices. However, relationships among devices can become quite complex that is beyond the simple example of two-device direct interaction. There can be linear or non-linear multiple-device interactions that are involved. Those complex communication relationships have become increasingly common. For example, in the IoT space, a chain or system of sensors might work together to perform a certain function. Each sensor might have a different manufacturer or deployer. Similarly, in cloud computing, there is commonly a complex relationship between the platform provider and a customer of the platform who is a vendor for multiple businesses. The vendor may serve different end customers. The operation and management of those complex systems can be challenging.

Figure 1A:
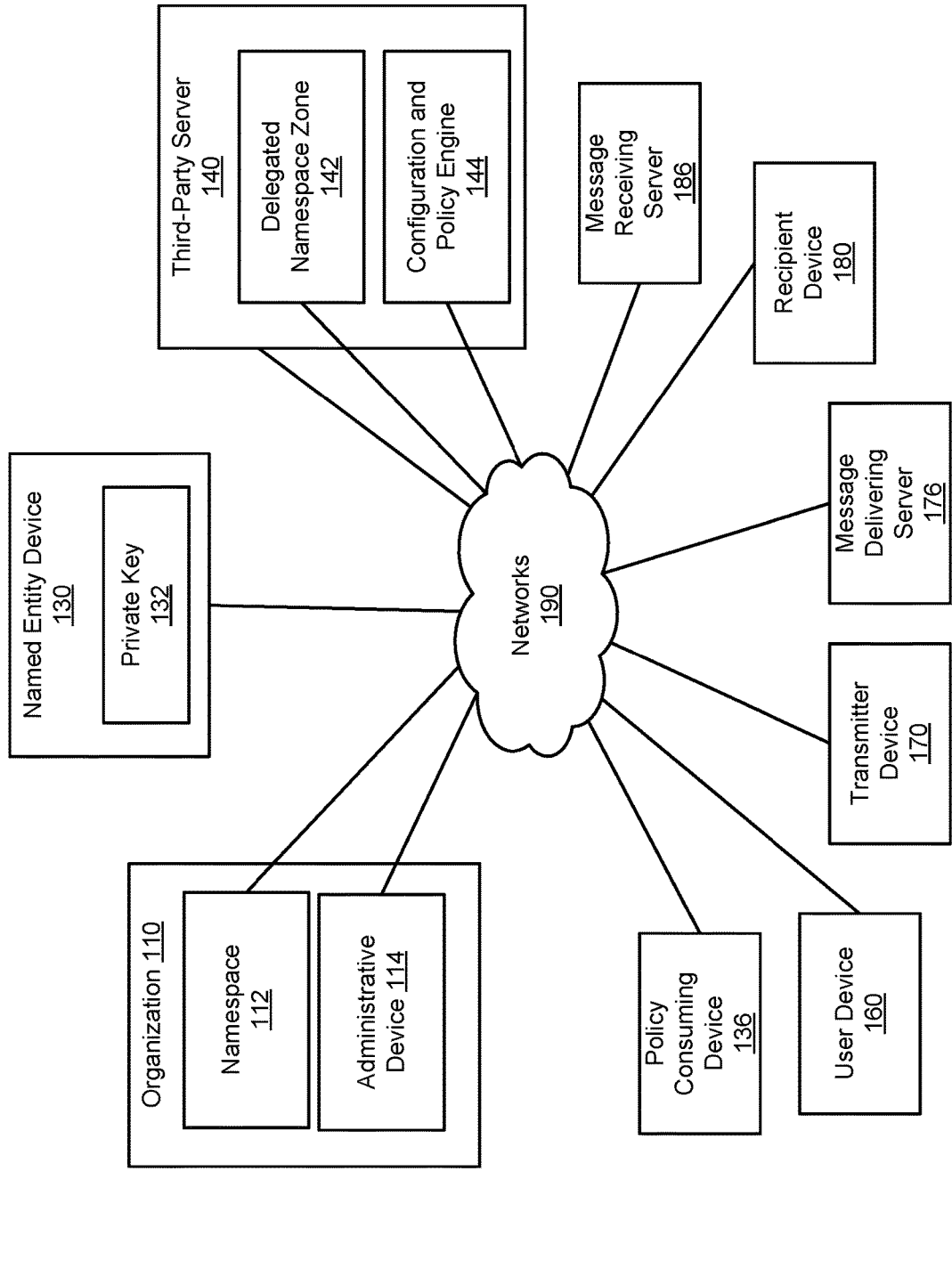
FIG. 1A is a block diagram illustrating an example system environment, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An application environment may be a system that involves multiple devices that perform operations and interact with each other for certain purposes. Common examples of application environments include email systems, Internet of things (IoT) systems, cloud computing, etc. In order for a device to determine whether it can interact with another device for a certain action, the device may need to authenticate the other device.

In some embodiments, an application-operating organization may delegate a third-party server to serve as an automated contextual authentication responder. By way of example, the third-party server may receive, from the organization, one or more rules governing authentication of messages transmitted from a named entity that is associated with the organization. The third-party server is designated by the organization for managing part of the namespace of the organization. The named entity is identifiable by an identifier under the delegated namespace. The third-party server may receive an authentication query from a message recipient that attempts to authenticate a message transmitted from a transmitter device purportedly associated with the identifier of the named entity. The third-party server may determine, based on the identifier and the rules specified by the organization, a response to the authentication query. The third-party server may transmit the response to the message recipient. The response includes information that allows the message recipient to authenticate the message.

Upon authentication of other devices, a device in an application environment may need to determine whether it has the authorization to interact with the other device. The authorization of a device is often determined by the application-operating organization which may divide participant devices into different roles. The application-operating organization may set forth different interaction control policies that regulate the authorization of various participant devices in an application environment. In some embodiments, the application-operating organization may also delegate the management of device authorization policies to the third-party server.

By way of example, the third-party server may perform the determination and distribution of network interaction control lists, which govern the authorization of devices. In some embodiments, the third-party server may receive one or more policy settings from the organization. The third-party server may receive an authorization query from a policy consuming device. The authorization query may include an identity of a named entity device that sent a message to the policy consuming device and associated metadata about the message. The third-party server may determine the role of the named entity device specified in the one or more policy settings based on the identity and the associated metadata. The third-party server may generate an interaction control list based on the policy settings and based on contextual metadata. The interaction control list includes information that specifies whether the named entity device is authorized to communicate with the policy consuming device. The third-party server may transmit the interaction control list to the policy consuming device as a response to the authorization query. The interaction control list causes the policy consuming device to react to the message based on the interaction control list.

Example System Environment:

Referring now to figure (FIG. 1A, shown is a block diagram illustrating an example system environment 100 of a process delegation system in which an organization may delegate various tasks to a third-party server that is specialized in performing the tasks, in accordance with some embodiments. Some of the tasks may include sender identification discovery, automated generation of policy recommendations, and setting up interaction control configuration through a guided workflow. The system environment 100 may include an organization 110, a named entity device 130, a third-party server 140 that performs various delegated tasks, a policy consuming device 136, a user device 160, a transmitter device 170, a recipient device 180, and networks 190. In some embodiments, the system environment 100 may also include a message delivering server 176 and a message receiving server 186. In various embodiments, system 30 may include different, additional or fewer components and entities. Also, in some situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a profit organization or a non-profit organization. An organization 110 may define an application environment in which a group of devices organizes and perform activities and exchange information. The system environment 100 may include multiple organizations 110, which may be customers of the third-party server 140 that delegate certain tasks to the third-party server 140. For example, an organization 110 may delegate the policy management and generation of policy recommendations to the third-party server 140.

An organization 110 may have various resources that are under its control. Example resources include a namespace 112 and an administrative device 114. In some embodiments, some of the named entity devices 130 and some of the policy consuming devices 136 may also be part of the organization's resources. For example, some of the named entity devices 130 and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a policy consuming device 136 or both.

Figure 9:
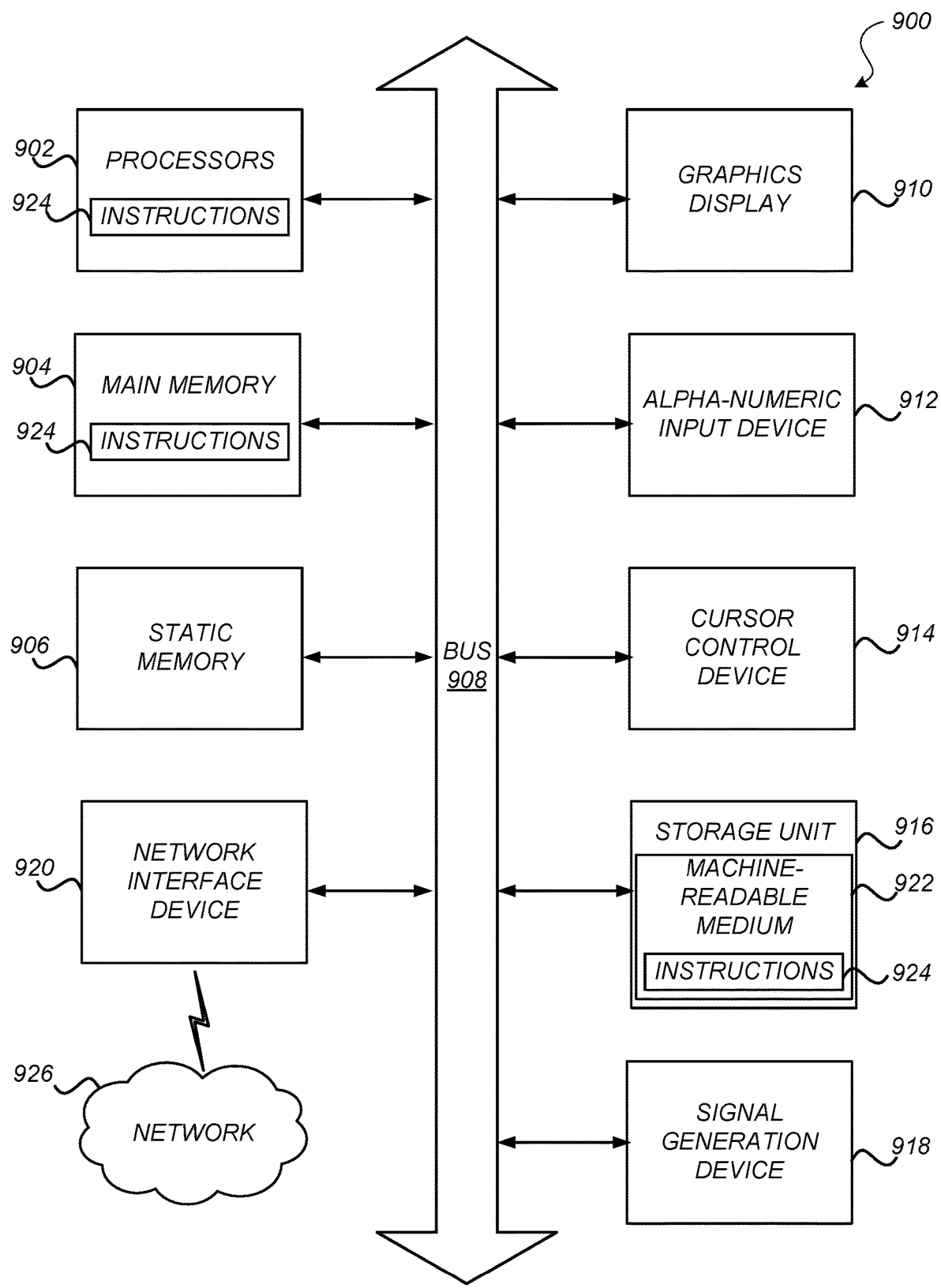
FIG. 9 is a block diagram illustrating components of an example computing machine, in accordance with some embodiments.

To manage its namespace 112, an organization 110 may include and control a namespace server. A namespace server can be a domain owner DNS server. For example, an organization 110 may operate a BIND (Berkeley Internet Name Domain) server. Some or all of the components of a namespace server is illustrated in FIG. 9. The namespace server for an organization 110 operates the namespace 112 of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace 112 associated with an organization 110 may store DNS records for use in a DNS system, manage namespace for the domain name associated with the organization 110, delegate one or more sub-domains to other servers that can be authoritative, and answer queries about the namespace of the domain. A namespace 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a top-level domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, an organization 110 may divide different branches of its namespace for different types of entities and devices. For example, natural persons may be under the namespace _persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA (transport layer security authentication) record type, RFC 6698). DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 9. An administrative device 114 may be operated by an administrator, whether it is a robotic agent or a natural person. An administrative device 114 may manage identity records of named entity devices 130 and policy consuming devices 136 that are associated with the organization 110. An administrative device 114 may also manage the configuration of various tasks that may be delegated to the third-party server 140, such as secure message distribution, encrypted device update distribution, namespace management, authentication services, policy management, and policy recommendations, which may be performed by various engines discussed in further detail in FIG. 2. For example, an administrative device 114 may provide configuration settings to the third-party server 140 to allow the third-party server 140 to manage configurations on behalf of the organization 110 and recommend new or modified configurations to address changes in the application environment. An administrative device 114 may also change the settings associated with various components and resources in the organization 110.

An organization 110 may create an application environment for various devices to perform activities and interact with each other. The application environment in this context may be distinguished from software applications (software programs) that may also be mentioned in this disclosure. An application in this context may be a system that involves multiple participants that may authenticate and trust one another. The participants may perform certain common operations and interact with each other. Certain actions may be autonomous or may be decided by individual participants, while other actions may be defined by the policies set forth by the organization 110. A participant device may communicate with the third-party server 140, which is delegated by the organization 110 to manage the policies of the organization 110. Participant devices of an application environment may include named entity devices 130 and policy consuming devices 136. Some of the devices may serve both roles. Examples of application environments may include distributed applications with clients and servers, sensor and actuator systems, camera systems, email systems, cloud computing systems, and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies in controlling how the third-party server 140 behaves when performing the delegated tasks. The rules and policies may be related to authentication and authorization.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings of dangerous road conditions to autonomous vehicles. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and has one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 9. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device or a network-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM (radio frequency communication) over Bluetooth, but not a complete Internet protocol suite.)). In some embodiments, some IoT devices may include a memory that can store a limited set of basic instructions, but may not have sufficient computing capability to dynamically determine context-specific policies for a given situation. Those devices may rely on another device such as the third-party server to perform computations dynamically for the devices.

In some embodiments, a named entity device 130 may include a private key 132 and a corresponding public key that are generated based on PKI (public key infrastructure). The private-public key pair may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a TPM (trusted platform module). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server, a computing server, a third-party service provider, or 3PSP. The term "third party" may be viewed from the perspective of the organization 110, which may delegate certain tasks and services to another company (a third-party company), which has the expertise to perform the tasks and services. For example, the organization 110 may be a customer of the third-party server 140. The services provided by the third-party server 140 may include managing policies for an organization 110, recommending new policies to an organization 110, authentication responses on behalf of organizations 110, policy distribution on behalf of organizations 110, secure software distribution to named entity devices 130, secure information distribution to policy consuming devices 136, and other tasks that may be authentication and authorization of various named entity devices 130 and policy consuming devices 136, such as IoT devices. Various services provided by the third-party server 140 may take the form of SaaS (Software as a Service). In one embodiment, an organization 110 may integrate certain processes or services provided by the third-party server 140 via an API (application programming interface), which allows the third-party server 140 to inspect some of the messages directed to or in transit in the organization 110 and enables the third-party server 140 to apply various policies after receiving the messages. Some examples of services that may be performed by the third-party server 140 are discussed in further detail below with reference to FIG. 2.

Some or all of the components and hardware architecture of a third-party server 140 are illustrated in FIG. 9. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace 112. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a configuration and policy engine 144. The configuration and policy engine 144 may determine rules for various participants in an application environment and may also work with an enrichment engine to generate one or more new policy recommendations for the organization 110. The policy recommendations may be generated in the course of managing the operation of an application environment that is governed by the policies of the organization 110. The third-party server 140 may identify new devices and entities and automatically determine the potential rules that should apply to those new devices. A policy may be defined and initiated by an organization 110. A policy related to how devices interact with each other may be referred to as an interaction control policy. An organization 110 may transmit the policy setting to or configure the policy setting at the third-party server 140. The configuration and policy engine 144 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The configuration and policy engine 144 may determine dynamically one or more context-specific policies that are applicable to a policy consuming device 136. The configuration and policy engine 144 may transmit the determined policies to the policy consuming device 136 as an interaction control list. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy consuming device 136 may be a device associated with a policy consumer that consumes an interaction control list provided by the third-party server 140. A policy consumer is an entity that consumes policy from the third-party server 140. A policy consuming device 136 may be a named entity device 130, but may also be an anonymous device. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself, but may also be a part of the policy consuming device 136 that is anonymous. For example, a browser plugin may be a policy consumer that receives interaction control lists but does not have an identity.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 9. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organization 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as _devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to _devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 9. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. The network 190 may be any communication network that transmits data and signals by any suitable channel media such as wire, optics, waveguide, radio frequency, ID badge with a QR (quick response) code, infrared, or any suitable electromagnetic media. The network 190 may also be a direct communication between two devices. The network 190 can be in any topologies, such as point-to-point, star, mesh, chain, bus, ring, and any other suitable, regular or irregular, symmetric or not, cyclic or acyclic, fixed or dynamic (e.g., certain devices moving) topologies.

Overview of Policy Determination Process

Figure 1B:
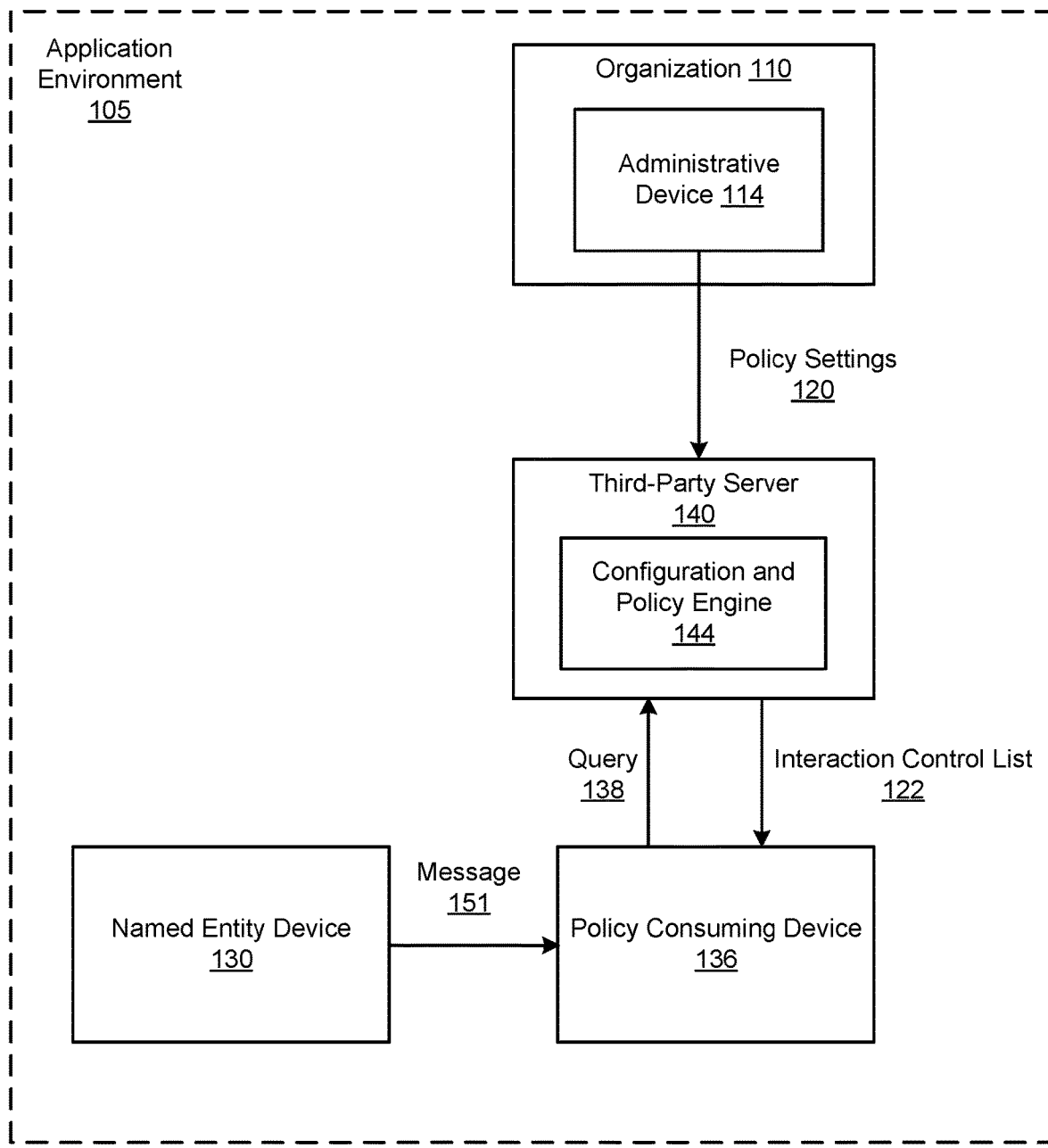
FIG. 1B is a block diagram illustrating an example flowchart for generating interaction control lists by a third-party server, in accordance with some embodiments.

Referring to FIG. 1B, a block diagram illustrating an example process of determining message authorization in an application environment 105 is shown, in accordance with some embodiments. An application environment 105 may be created by one or more organizations 110 and includes various participants that have different roles in performing certain operations or simply interacting with each other. The organizations 110 set forth computer-implemented policies defining certain rules on how the participants should operate in the application environment 105. The third-party server 140 carries out the distribution of the policies on behalf of one or more organizations 110. The payload of the policy to be transmitted to a policy consuming device 136 may take the form of an interaction control list.

At a high level, a policy consuming device 136 receives a message 151 from a named entity device 130. The policy consuming device 136 needs to decide whether it has the authorization to interact with the named entity device 130 in order to act on message 151. The policy consuming device 136 is guided in this decision by the configuration and policy engine 144. The process may include a configuration phase and a message phase. The configuration phase may include an organization 110 communicating a policy setting 120 to the third-party server 140. In the message phase, the policy consuming device 136 gets its policy information from the configuration and policy engine 144, and in certain circumstances, may make ad-hoc queries against the configuration and policy engine 144 in order to determine whether or not the message the policy consuming device 136 has received from the named entity device 130 is authorized from processing. If the message's source identity can be authenticated and the source identity and message context meet the authorization criteria according to the interaction control list, the message will be processed. If the message does not fit the authorization criteria, it may be discarded or reported.

The interaction control policy, maintained in the configuration and policy engine 144, describes the interaction between entities, which may involve some storage or computation offloading. For example, a policy consuming device 136 might be the target of communication from a named entity device 130, but this particular policy consuming device 136 lacks either or both of the storage necessary for reading the policy, or the computational power to process the policy. In this case, the policy consuming device 136 would rely on its direct communications with others and request for storage and computation. The embodiment may be implemented in edge computing, which places a summarization layer in the field between the devices which generate information and the Cloud.

For a policy consuming device 136 to properly react to a message sent from a named entity device 130, authentication and authorization may be performed. Authentication verifies the identity of a message transmitter and confirms that the message transmitter is the party that the message transmitter claims to be. The authentication may be performed through verifying the message transmitter's digital signature. For example, a message 151 may include a digital signature of the named entity device 130. In receipt of the message 151, the policy consuming device 136 uses the public key of the named entity device 130 to verify that the named entity device 130 is in the possession of the private key, thereby authenticating the named entity device 130. The policy consuming device 136 may retrieve the public key of the named entity device 130 by different methods, such as from an organization 110 or via a delegated namespace managed by the third-party server 140, as discussed in FIG. 1B.

In contrast to authentication, which verifies the identity of a message transmitter, authorization verifies that the message transmitter with a known identity has the authority to send the message or the message recipient should react to the message given the identity of the sender. A named entity device 130, which sends a message 151, may be associated with one or more roles in the application environment 105. For some messages or situations, two participating devices may be free to interact. However, for other messages, the policy consuming device 136 may verify the authorization of the named entity device 130 before reacting to the message 151. For example, in a traffic system, the named entity device 130 may be a sensor that transmits sensor data. The policy consuming device 136 may verify that the sensor is authorized to transmit the sensor data in a given situation before relying on the sensor data. One or more organizations 110 may set the policies on the roles and rules of various participants to define which participants have the authority to carry out certain actions in various situations. The policy consuming device 136 relies on the interaction control list 122 to determine the authority of the named entity device 130. The interaction control list 122 may also include data or instructions specifying how the policy consuming device 136 should react to the message 151.

Example Third-Party Server Components

Figure 2:
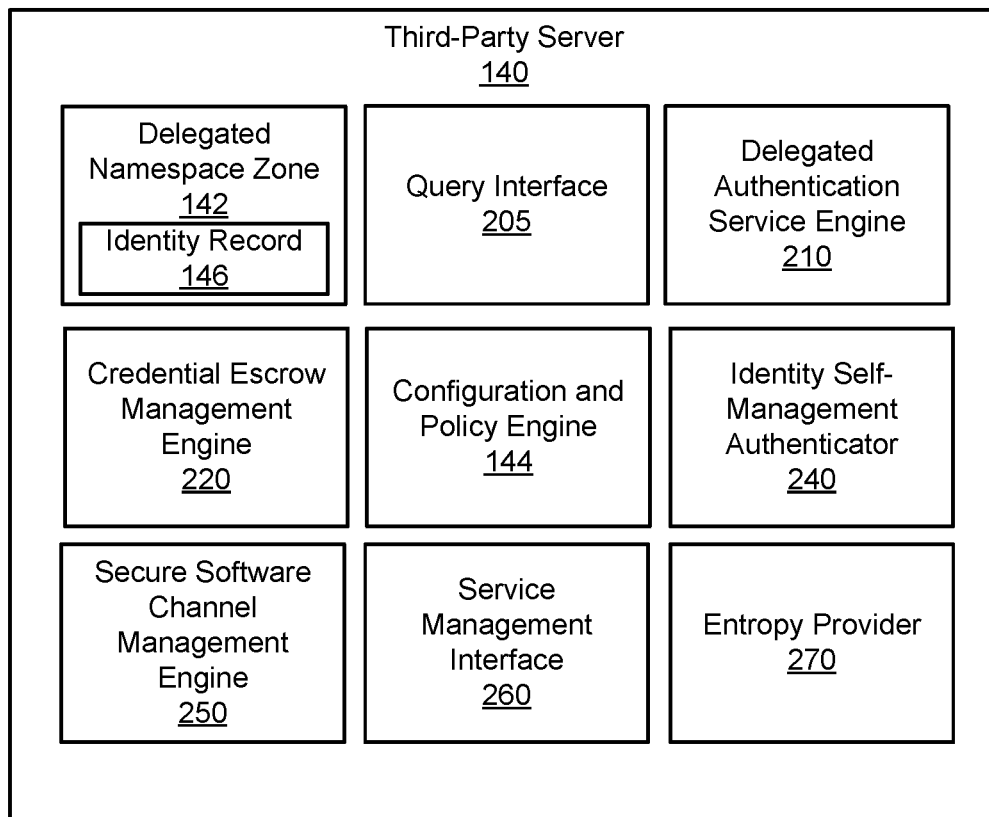
FIG. 2 is a block diagram illustrating various components of an example organization computing server, in accordance with some embodiments.

FIG. 2 is a block diagram illustrating an example third-party server 140, in accordance with some embodiments. In some embodiments, the third-party server 140 may include a delegated namespace zone 142, a query interface 205, a delegated authentication service engine 210, a credential escrow management engine 220, a configuration and policy engine 144, an identity self-management authenticator 240, a secure software channel management engine 250, a service management interface 260, and an entropy provider 270. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 9.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, another suitable server publicly accessible server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content, although not every trait needs to exist in various embodiments. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 8698), and DKIM (RFC 8376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142. Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 correspond to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formals (e.g., tabular, CSV, tab delimiter, XML, JSON) to store the identity records 146 are also possible.

The query interface 205 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 205. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 205. The device uses its private key to decrypt the symmetric key. The symmetric key is then used to decrypt the encrypted data payload.

The query interface 205 may serve to anonymize the identities of organizations 110 and devices. For example, the third-party server 140 may serve as a centralized server for the distribution of various messages on behalf of different organization customers. The query interface 205 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 205 will not reveal the identity of the organization 110 because the organization has delegated the message response task to the third-party server. In some embodiments, the third-party server 140 may provide a specific address of the query interface 205 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 205 may take various forms. For example, in some embodiments, the query interface 205 takes the form of an API such as REST (representational state transfer), SOAP (Simple Object Access Protocol), RPC (remote procedural call), or another suitable type. In some embodiments, the query interface 205 may be a namespace server such as a DNS server. In some embodiments, the query interface 205 may be a network routing node or a packet switching node. Other types of network interface may also be used as the query interface 205.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include data metadata that allows the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications may arise from the contexts constraining the communications. Besides verifying the credential, a message recipient may also verify other contexts. Examples of such contexts may include time, location, directionality (one way or two way), communication method (e.g. mobile phone not email), sequencing (in a chain of communications, whether the order matters), topology (one-to-one, one-to-many, many-to-one), modifiability (whether the communications can be modified), modifications (whether a modification is allowed), and form of ID (the primary authenticated key into the database, for DNS this is a domain, for other datastores such as IPFS and blockchain, the keys are different). Non-substantive constraining context or limitations to the communications may be managed by the third-party server 140. Further examples of contexts include amplification, aggregation, summarization, shelf life, and revocation. Another example is a computationally intensive context—one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback the message at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The configuration and policy engine 144 may determine rules for various participants in an application environment. A policy may be defined and initiated by an organization 110. An organization 110 may transmit the policy setting to, or build the policy at, the third-party server 140. The configuration and policy engine 144 translates the policy to one or more configurations, whether generated automatically based on the policy requirement or generated partially manually through a guided workflow.

The configuration and policy engine 144 may determine dynamically one or more context-specific policies that are applicable to a policy consuming device 136. The configuration and policy engine 144 may transmit the determined policies to the policy consuming device 136 as an interaction control list. Interaction control lists may be a set of rules that define what devices are authorized to interact with a policy consuming device 136 and define how the policy consuming device 136 may behave in certain situations. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role provides a logical container for how similar members should interact. A member is a participant in an application environment. A member may be a named entity device 130 or a policy consuming device 136. Continuing with the example of a role being a type of sensors, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata. A rule may be a feature of a particular role, but may also be a feature of the broader application. The details of the policy may be translated into various configurations in order for the policy to be achieved.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The configuration and policy engine 144 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted with the device's public key, which may be included in a DNS record. For the DNS record of a named entity device 130, the public key or certificate may be removed after a predetermined period to allow an ephemeral PKI-based identity. The identity self-management authenticator 240 may authenticate the ephemeral identity. For instance, if a device has a core identity with the name 123.edge._device.example.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at _serviceclient.123.edge._device.example.com by virtue of the application being configured to allow devices to establish short-lived sub-identities in this fashion. The process of establishing this name-pubkey identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device.example.com as the parent or core identity. The second record at 123.summarizer._device.anotherexample.com may be a TLSA record that contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._anotherexample.com name, (3) use the private key associated with the 123.edge._device.example.com identity to generate a cryptographic signature of the CSR and a nonce, (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device._anotherexample.com is 123.edge._device.example.com. (3) retrieve the public key associated with the 123.edge._device.example.com identity and use that public key to authenticate the CSR, nonce, and signature, (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 205. In response, the secure software channel management engine 250 may generate the appropriate data payload as a response to the query. The response may be encrypted as discussed above with reference to the query interface 205.

The secure software channel management engine 250 may maintain a database that correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS (Hypertext Transfer Protocol Secure) or MQTT (Message Queuing Telemetry Transport)) the secure software channel management engine 250 may correlate the device's identity with the appropriate software channel and indicate to the client device the unique identifier of the current version of the software. The unique identifier may be a version tag (e.g., v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as a data payload. The third-party server 140 may encrypt the asset with the public key associated with the requesting device's identity. This may be direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same provided via the initial update request interaction to verify the software download. Alternatively, the certificate of public key may be referenced in the update using the signer's DNS name, whereby the device may retrieve the public key used for signature verification from DNS.

The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. An example of an artifact management engine may include services provided by companies such as ARTIFACTORY.

The service management interface 260 may be an interface for an organization administrator to change settings with respect to various engines such as to change message distribution policies associated with the query interface 205, change the authentication policy in the engine 210, to upload credential to the credential escrow management engine 220, define various policies for distribution by the configuration and policy engine 144, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or be in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that are expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device with the keys. The entropy provider 270 may also generate private-public key pairs for a device. The entropy provider 270 may further be used to generate random symmetric keys that are used to encrypt messages and other data payloads transmitted from the query interface 205, whether the data payloads are device updates generated by secure software channel management engine 250 or other types of message payloads.

Automatic Policy Determination and Distribution

FIG. 3 through 8B discusses various automatic policy determination and distribution examples that may be performed by the third-party server 140. Various policy services may be provided by the third-party server 140 to various organizations 110 as SaaS. Each organization 110 may delegate a portion of a public database, such as the namespace 112 to the third-party server 140 as delegated namespace zone 142. The third-party server 140, in turn, may respond on behalf of the organizations at scale. The SaaS may be multi-tenant that allows various organizations to have their own settings and configurations. The third-party server 140 may provide communication patterns concisely, universally, and securely. The third-party server 140 may use a broadly-recognized, delegated, and discoverable namespace for identity management. The third-party server 140 may provide services which allow organization to manage interaction control policies. The policies may be targeted policies. Depending on the rules in a policy, a targeted policy, which may be an interaction control list, may be presented to a policy consumer device 136 requesting the policy. The provided interaction control list may represent the logically adjacent entities with which the policy consuming device 136 is expected to interact. The third-party server 140 may provide dynamic responses to any requests for interaction control lists. The interaction control list representation may change dynamically, depending on context related to the entities within the policy or the policy consuming device 136.

Referring again to FIG. 1B, an example process of authorization determination is illustrated in accordance with some embodiments. An administrative device 114 provides one or more policy settings 120 to the third-party server 140. The policy settings 120 define the roles and rules of various participants in the application environment 105. While FIG. 1B shows a single organization 110, multiple organizations 110 may contribute to the policy settings 120. For example, in an application environment 105, the operator of the application environment 105 and the manufacturer of the policy consuming device 136 may both contribute to the policy settings 120. In some cases, the named entity device 130 may also serve as a message recipient. The administering entity of the named entity device 130 may also contribute to the policy setting 120 with respect to the policy of the named entity device 130. The named entity device 130 transmits a message 151 to the policy consuming device 136. In receipt of the message 151, the policy consuming device 136 may first authenticate the named entity device 130. The policy consuming device 136 may in turn determine the authority of the named entity device 130 in sending the message. For example, the policy consuming device 136 sends a query 138 to the third-party server 140. The query 138 may include the identity of the named entity device 130 and the message's metadata, which provide information on the nature of the message 151. The configuration and policy engine 144 may analyze various policy settings 120 from different organizations 110 to dynamically determine a real-time and customized response specific to the policy consuming device 136 given the situation. The configuration and policy engine 144 formats the response as an interaction control list 122 and transmits the interaction control list 122 to the policy consuming device 136. The policy consuming device 136 consumes the interaction control list 122 to determine whether the named entity device 130 is authorized and how the policy consuming device 136 should react.

The third-party server 140 may be a delegated server in the application environment 105. Various organizations 110 may delegate the determination of the appropriate response to query 138 to the third-party server 140. Being a delegated server, the third-party server 140 may serve as a well-known, centralized, and authoritative source for various application environments 105, which provides various advantages over having the organization 110 to determine a response. For example, the centralization of the determination of policies reduces the number of queries 138 need to be sent from the policy consuming device 136 in a given scenario. The policy consuming device 136 may be subject to policies of multiple organizations 110. The third-party server 140, serving as a centralized source, may determine a real-time and customized interaction control list 122 that is compiled from policy settings 120 provided by different organizations 110, thereby saving the policy consuming device 136 from querying multiple organization's servers. Also, by having a centralized server to serve as an authoritative source in the application environment 105, any policy command in the form of an interaction control list can be authenticated based on the digital signature of third-party server 140 by using the public key of the third-party server 140. Authentication is simplified as a result. The delegated nature of the third-party server 140 may also allow easier participation of policy setting from an organization 110 because the organization 110 may set a policy through a user-friendly interface of the third-party server 140 and does not need to have the specialty or knowledge in the communication protocols and technical complexity in providing interaction control list 122 to the policy consuming device 136.

The third-party server 140 is a known or discoverable server in the application environment 105. To allow devices to query the third-party server 140, the third-party server 140 may be associated with a point of interaction, which may be the third-party server's URI or URL for the query 138. The point of interaction may be stored in the memory of a policy consuming device 136 when the device is manufactured or provisioned so that the third-party server 140 is known and authoritative when the policy consuming device 136 is deployed. The point of interaction of the third-party server 140 may also be auto-discoverable. For example, the policy consuming device 136 may store the application name or other information for a location on the Internet (e.g., DNS) to look up the applications to which the policy consuming device 136 is subscribed and to look up the point of interaction of the third-party server 140. For example, the point of interaction of the third-party server 140 may be published in the namespace to which the application belongs. The auto-discovery allows the operating entity of the policy consuming device 136 to change the subscription of different applications and the third-party server to change the point of interaction. This reduces the required effort in provisioning or reconfiguring new devices, because the device may automatically discover the third-party policy server's interaction point without specific configuration on the part of the technical administrator.

A public namespace system such as DNS or a blockchain may be used in various aspects of the application environment 105, in accordance with some embodiments. In one aspect, the DNS may be used for auto-discovery of the point of interaction of the third-party server 140. For example, multiple policy consuming devices 136 may be operated by an organization 110 and have their identities living in a sub-namespace of the DNS of the organization 110. The organization may declare the point of interaction of the third-party server 140 at the location of the DNS. The policy consuming devices 136 may traverse its own DNS hierarchy to discover the point of interaction. The use of DNS to declare a point of interactions may also turn the applications in which a policy consuming device 136 participates into subscription-based. For example, a DNS location may include a list of points of interaction that serve as the subscription of the policy consuming device 136. The list of points of interaction may be easily changed by the DNS owner to adjust the subscription of the policy consuming device 136. The use of DNS auto-discovery may be used to place a record of application name and point of interaction in a well-known format at the device's DNS name, or at a well-known location in the DNS hierarchy above the device so that many devices under a branch of the DNS may get inherited application membership configuration.

In some embodiments, the DNS may be delegated to the third-party server 140 by an organization 110 that operates the policy consuming device 136 so that the third-party server 140 may control the identities of the policy consuming device 136 and freely adjust its point of interaction that is discoverable by the policy consuming device 136.

In another aspect, the public namespace system may also be used for the communications of a policy consuming device 136 and the third-party server 140. In some embodiments, an organization 110 may operate multiple policy consuming devices 136. The organization 110 may delegate the sub-namespace that contains the identities of the policy consuming devices 136 to the third-party server 140 for management. The policy consuming device 136 may send the query 138 as a form of DNS query. In turn, the third-party server 140 may publish the interaction control list 122 in the DNS for the policy consuming device 136 to retrieve as a TXT or other well-known record present in the DNS.

While a single application environment 105 is shown in FIG. 1B, a participant such as a policy consuming device 136 may participate in multiple applications environments 105. The names of the participating applications and the points of interaction may be stored in the device's memory or be auto-discoverable by the device. Some of the participating applications may be related to each other. For example, a set of applications may be associated with a hierarchy. A policy consuming device 136 may participate in a primary application, which may provide information with respect to a secondary application in which the policy consuming device 136 should participate given a situation, such as whether the policy consuming device 136 is geographically located. For example, an autonomous vehicle, as a policy consuming device 136, may be registered with a primary traffic application that is operated by a state department of motor vehicles. The primary traffic application may direct the vehicle to contact a second traffic application as the vehicle enters a local municipal.

The configuration and policy engine 144 manages the configuration of various policies as well as the generation of the policies during messaging between a named entity device 130 and a policy consuming device 136. The configuration and policy engine 144 stores the policy settings 120 and manages the scope or context of allowable communications by the members. In some embodiments, the policy definition includes a plurality of roles, each of which members is stored in the form of the identity of the named entity devices 130. A role may also be associated with one or more rules. A rule may define the authority of a role or a member. A rule may also define how a policy consuming device 136 may behave. The configuration and policy engine 144 may also store configuration information of each member device so that the configuration and policy engine 144 may generate the interaction control list 122 in an appropriate format. The configuration and policy engine 144 may also store information related to the communication channels to be used to communicate with the policy consuming device 136, such as a certain API or a DNS location.

By way of example, in response to receiving a message 151, the policy consuming device 136 may authenticate the named entity device 130. Upon successful authentication, the policy consuming device 136 may provide the identity of the named entity device 130 to the third-party server 140 as part of the query 138. The query 138 may also include metadata that describes the nature of the message 151 and contextual information related to policy consuming device 136. Contextual information may also include how the message 151 is received. Example contextual information may include the time of the message 151, the location of the policy consuming device 136, the operator identity of the policy consuming device 136, the number of messages sent from the named entity device 130 within a period of time, and other useful contextual information that may help the configuration and policy engine 144 to determine the appropriate policy. The configuration and policy engine 144 may rely on the identity in the named entity device 130 included in query 138 to identify a role to which the named entity device 130 belongs. Based on the rules associated with the role, the configuration and policy engine 144 determines whether the named entity device 130 is authorized to send the message 151 to the policy consuming device 136. The configuration and policy engine 144 may also select the rule that is applicable to the situation based on the metadata of the message 151 and the contextual information. The policy engine may generate an interaction control list 122 that includes the data for the policy consuming device 136 to determine how the device should react to the message 151. The interaction control list 122 may further inform the policy consuming device 136 on how to authorize future messages from the named entity device 130 given approved contexts in order to minimize future queries 138 given similar messages 151.

An interaction control list 122 may take various suitable forms and have different degrees of complexity in various embodiments. In some embodiment, the interaction control list 122 may include instructions for the policy consuming device 136 to execute. In some embodiments, the interaction control list 122 may include a list of identities of members that are authorized to communicate with the policy consuming device 136. In some embodiments, each authorized member listed may be associated types of actions that the member is authorized, such as read data, transmit data, unrestricted communication. In some embodiments, the interaction control list 122 may include a set of parameters and parameter values that are in the format of key-value pairs for the policy consuming device 136 to carry out a function based on the parameter values. In some embodiments, the interaction control list 122 may include a Boolean value that represents whether the named entity device 130 is authorized or not. For example, certain policy consuming device 136 (e.g., some IoT devices) may not be equipped with sufficient processing capacity to determine the action to be taken. The configuration and policy engine 144 may perform the computation on behalf of the policy consuming device 136 and provide a simple response to the device. For example, if the named entity device 130 is authorized and a Boolean value of True is sent, the policy consuming device 136 may carry out the default action upon receiving the message 151.

The interaction control list 122 may take the form of a well-known format or a standardized format. For example, at least part of the interaction control 122 may be formatted in well-known formats such as JSON and XML. In some embodiments, an industry that operates various application environments may negotiate, develop, and promulgate a new standardized format that is used to carry out the interaction control list 122. The standardized format may be used across different application environments 105 and different policy consuming devices 136. The use of a standardized format may reduce the communication needed to determine the payload format for the interaction control 122 when a large number of policy consuming devices 136 operated and made by different organizations jointly participate in an application environment 105.

The configuration and policy engine 144 may generate the interaction control list 122 in different manners in various embodiments. In some embodiments, the configuration and policy engine 144 generates a predetermined response as the interaction control list 122. The predetermined response may have a standard answer given a query 138. For example, the third-party server 140 may provide a list of authorized members of a role for the policy consuming device 136 to determine whether the named entity device 130 is in the list. The predetermined response may be a public response that does not include any private information or contextual information. The predetermined response may be used in various situations, but are particularly suitable for situations where either the named entity 130 or the policy consuming device 136 is not authenticated or is anonymous.

The interaction control list 122 may also be determined in real-time and dynamically based on the identity of the named entity device 130, the identity of the policy consuming device 136, the nature of the message 151, and any contextual information. If both the named entity device 130 and the policy consuming device 136 are authenticated, the configuration and policy engine 144 may determine the applicable rule dynamically based on the metadata that describes the type of messages 151 and the contextual information. For example, the location of one of the devices may be used to determine context-specific interaction control list 122. The type of policy consuming device 136 may also affect the interaction control list 122. For example, the configuration and policy engine 144 may generate a more detailed and customized interaction control list 122 when both the policy consuming device 136 and named entity device 130 are authenticated and a generic response when the policy consuming device 136 or named entity 130 are anonymous. The timing of the receipt of the message 151 may also affect the interaction control list 122 generated. An organization 110 may specify different rules with respect to different times of the day. The interaction control list 122 may also be device-specific. The configuration and policy engine 144 may generate a customized interaction control list 122 based on the identity of the policy consuming device 136. The generated interaction control list 122 may also be limited in scope. The configuration and policy engine 144 may determine the scope of the rules provided to the policy consuming device 136 based on the authentication and the identity of the policy consuming device 136.

Interaction control list 122 may also be compiled with the policy settings 122 of multiple organizations 110. For example, an application environment 105 may be operated by more than one organization 110, and the policy consuming device 136 is also operated by a different organization 110. Each organization 110 may have its own policy with respect to a situation. The configuration and policy engine 144 may receive policy settings 120 from multiple organizations 110. The configuration and policy engine 144 may compile the policies and determine the result of various rules in light of various policies. The configuration and policy engine 144 converts the result into a single interaction control list 122.

The policy distribution may also take the form of secure rule distribution, which may adopt end-to-end encrypted rule sharing. In some embodiments, to initiate communication with the third-party server 140, a policy consuming device 136 may need to be on an authorized list and properly authenticated. The policy consuming device 136 and the third-party server 140 may publish their public keys on the DNS. The policy consuming device 136 and the third-party server 140 may use the public keys to verify the digital signatures of each other and authenticate each other. The policy consuming device 136 may use the public key of the third-party server 140 to encrypt the query 138. The third-party server 140 uses its private key to decrypt the query 138. In response, the third-party server 140 may use the public key of the policy consuming device 136 to encrypt the interaction control list 122. In response, the policy consuming device 136 uses its private key to decrypt the interaction control list 122.

The policy consuming device 136 is capable of performing authentication and authorization in any order, as well as conditionally. In a first example, the original message signature may fail source authentication but be delivered via a trusted system for verifying the information it presents. For example, a sensor could attempt to transmit an observation to an edge node, but the message signature may be broken due to RF interference or some other message malformation in transit. The edge node extracts the observation value from the message and compares the value with other observations made from the same vicinity. If the observation is within a certain threshold of other observations made around the same time and place, or the message contains other authenticatable attributes permitted by the policy, the edge node may apply a cryptographic signature using the edge node's private key and transmit the observation to the hosted application. This way, the edge node attributes an observation to the source device, and the message may be labeled as 'authenticated by attribution'. The information may still be used by the application, though perhaps with human scrutiny applied when used directly for decision-making.

In a second example, an authenticated message arrives at a policy consuming device and the message sender is not on the policy's authorization list. In this example, the third-party server 140 may still elect to make use of the message but limit the impact on the system to certain constraints. For instance, if a message authenticates cryptographically but the sender is not specifically allowed by the policy and the message appears to originate from a relevant entity (for example, that the naming format for source identities is well-known and the policy may indicate that identities represented in a certain well-known naming format may be accepted for certain specific purposes) the third-party server 140 may accept and parse the message, but affix a label to the message or handle it with a different processing flow to ensure that the information may be collected, but only acted upon if other entities (human or machine) corroborate or validate the observation for processing.

In a third example, authentication of messages in a decoupled system provides flexibility in message authentication and authorization flows. In some cases, the third-party server 140 may find that performing authorization before authentication is computationally less expensive because comparing a sender's universal name against a list of authorized senders can be faster than performing cryptographic authentication of a message. By performing name comparison before cryptographic authentication, the third-party server 140 minimizes the impact of rejecting unauthorized messages at ingestion.

For the foregoing reasons, in the present disclosure, where a specific order is presented for authentication and authorization, that order is indicated by example only, and could be reversed, unless the specified order is specifically required for the use case presented.

Below is an example of an implementation of the application environment 105 in a traffic application environment. The implementation discussion is for example only and the disclosure is not limited to any traffic systems. The rest of the disclosure, such as FIG. 3 through FIG. 7, discusses additional use case implementations of application environments 105 and variations.

A policy consuming device 136 may be a vehicle that belongs to multiple application environments 105. One of those applications may be, for example, public.connected_roadway._applications.example.gov. At that name in the DNS, a number of TXT or other well-known records that describe the interfaces available for consuming policy from the configuration and policy engine 144 may be included.

The vehicle may include its own identity. The vehicle may be manufactured by an organization 110 that has the name example.com Motors. When the vehicle leaves the assembly line and the vehicle may receive an identity vin12345._device.example.com. The manufacturer (example.com) informs an example government entity "example.gov" that the vehicle should be assigned to the appropriate role in the public.connected_roadway application and example.gov makes the appropriate change in the application definition. The manufacturer may place a TXT record in its DNS namespace indicating the name of the applications all devices under that point in the DNS hierarchy should participate. Alternatively, or additionally, each vehicle leaving the assembly line may be configured with the names of the applications it will be participating in.

The participants in the application environment 105 may provide context information to the third-party server 140 in a variety of ways, depending on the role of the participants. Continuing with the example of the vehicle, the vehicle may represent the jurisdictions or areas in which it will be traveling in a traffic system application environment 105. Owing to privacy concerns, the vehicle may communicate this directly to the configuration and policy engine 144 in the form of a periodic update, or as a part of the policy query 138 interaction. The traffic system application environment 105 may also include a beacon. For the beacon, making the location of the beacon easily discoverable can be beneficial. The beacon may update its own location as a part of the metadata attached to its public identity. The beacon may have an identity 123.beacons._device.dot.gov, which indicates that its identity is owned by, for example, the Department of Transportation.

The public.connected_roadway application has two roles: vehicle and beacon. The vehicle role contains cars. The beacon role contains beacons. When a vehicle sends a query to the configuration and policy engine 144, it may indicate its own geolocation. The configuration and policy engine 144 responds with the DNS prefix of the beacons that the vehicle is expected to encounter. If the vehicle's geolocation is close to a jurisdictional boundary, the policy engine may respond with a policy containing two relevant jurisdiction prefixes. In another embodiment, the vehicle's operator may desire more privacy and may request the prefixes associated with the jurisdictions the vehicle expects to travel within a state, for instance, and avoid revealing specific geolocation of the vehicle. This preserves privacy as only the jurisdictional prefixes are sent, instead of the entire policy which may include every vehicle participating in the application. Since the vehicle may be communicating over an untrusted medium, the configuration and policy engine 144 may use the vehicle's public identity to discover a public key to use for encrypting the response.

The beacon may also periodically query the policy engine and retrieve a list of expected nearby beacons. Knowing which beacons should be operational nearby enables an individual beacon to positively ascertain and report when an unauthorized beacon is transmitting nearby, thereby making the beacon application resilient to persistent misconfiguration and abuse by impersonation or unauthorized operation of beacons.

While the example discussed above with FIG. 1B is illustrated with an application environment 105, in some embodiments certain elements can also be commonly shared in multiple application environments 105. For example, in some cases, authentication information such as device identities and credentials may be shared in different application environments 105. Likewise, in some cases, authorization information may also be reused in different application environments 105.

The sharing of authentication information among various application environments 105 provide versatility to the devices and allows the devices to better integrate into different new application environments 105. Conventionally, a device's identity and credential are bound to a specific application environment 105. The identity and credential cannot be easily transferred to another application environment 105. For example, the credential of a device of an email application cannot be used in an IoT application. Even though the device may choose to use the credential, the device conventionally often needs to re-register with different organizations 110 operating different application environments 105. In some embodiments, the identity record 146 of a device is stored in a well recognized and widely accessible namespace such as the DNS or a common blockchain so that the identity can be re-used across various unrelated application environments 105. According, the identity record 146 can become a universal identity and is no longer bound by a specific application environment 105 or a certificate authority. By providing the identity record 146 in the namespace, the named entity devices 130 can be authenticated by various organizations 110 using established channels and standardized methods. By way of using IoT as an example, an autonomous vehicle may have a universal identity that can be used in different application environments, such as a local traffic system, a weather application environment, a parking system, etc. By putting the identity record 146 in a well-established namespace such as the DNS, the autonomous vehicle does not need to pre-register itself as it participates in a new application environment 105, such as a new local traffic system as the vehicle travels to a new location. Various application environments 105 may authenticate the identity of the vehicle through the identity record 146 such as using the vehicle's public key stored in the namespace.

The authorization information of various named entity devices 130 may also be shared with various related application environments 130. Since a named entity device 130 may be associated with a more universal identity, the role and policy associated with the named entity device 130 may also be set across different application environments 130. The third-party server 140 may store the role of a named entity device 130 and determine the appropriate policies that are applicable to the role based on the role and the specific application environment 105. Continuing with the IoT example above, the autonomous vehicle may be associated with a role of vehicle. Since the identity of the autonomous vehicle may be fixed and be common in different application environments 105, the third-party server 140 may associate the autonomous vehicle with the role of vehicle in various environments. Each application environment 105 may determine the authorization scope of a particular role based on the policies specified by the operating organization of the application environment 105. For example, as the autonomous vehicle enters a new geographical location, it may attempt to retrieve traffic information from a local traffic system in which the vehicle may not have participated. The local traffic system may first authenticate the vehicle using the identity record 146 stored in the namespace using a standardized query to the third-party server 140. Upon the successful authentication of the vehicle, the local traffic system determines that the role of the autonomous vehicle is a vehicle. The third-party server 140 transmits an interaction control list to the local traffic system to specify the authorization information of the autonomous vehicle in participating the local traffic system. The interaction control list may be generated by the policy settings of the local traffic system as specified by the operating organization of the local traffic system.

In some cases, a policy associated with the authorization of a named entity device may be role specific and application independent while in other cases a policy may be application dependent. For example, a sensor may be associated with the role "sensor" regardless of application environment 105. The identity of the sensor may be stored in the DNS and be authenticable by various application environments 105. The authorization of the sensor may be bound by the role "sensor." The third-party server 140 may determine, based on the policy set by the manufacturer of the sensor, that the sensor can only be used to transmit information. The third-party server 140 may reject a request from the sensor to retrieve personalized information regardless of the application environments 105 in which the sensor participates. However, in other cases, the role may be application specific. For example, a vehicle may serve as a sensor in one traffic application to contribute traffic information to a local traffic information. Yet, the vehicle may participate in another unrelated application environment and performs things that are not in line with the role sensor.

The interaction control list provided to a policy consuming device 136 regarding the authorization information of the device or another device may be context specific. The third-party server 140 may provide a dynamic policy response to a query of a policy consuming device 136 so that only relevant and expected communication patterns and authorization information are provided to the policy consuming device 136. In some cases, a policy associated with a particular role may include a large number of participant devices that are associated with the role. This may be due to the role being inherently common or other reasons. For example, as discussed above, in some embodiments, an identity of a named entity device 130 may take the form of a more universally accepted identity that may be stored in a well-known namespace. Hence, the members of a particular role may grow overtime because the role may be not application specific. In any cases, an unfiltered interaction control list that includes a list of authorized devices can be large and sometimes irrelevant. The third-party server 140 may take into the account of metadata and other context information to determine dynamically a relevant and specific interaction control list for each query of authorization. For example, if a policy specified that only devices associated with the role vehicles may be eligible to receive traffic information from a sensor, the third-party server 140 may examine the metadata of vehicles and determine the vehicles that are in the geographical proximity of the sensor. The third-party server 140 may generated a specific interaction control list that includes only those vehicles and provide the list dynamically to a traffic system. While the example of contextual information discussed here is geographical location, other contextual information may also be used. Further detail related to a dynamically generated interaction control list is discussed in association with FIGS. 8A and 8B regarding device adjacency and relative topography (DARTH).

In some cases, while the identity of a named entity device 130 may be universal if desired, an application environment 105 may not have dealt with or have any policy associated with the device. For example, upon authenticating a named entity device 130, the third-party server 140 may determine the application environment 105 may not have a policy that addresses what the authorization of the named entity device 130 has. The third-party server 140 may perform a search in the specific information associated with the role of the named entity device. The third-party server 140 may generate new policy recommendations for the application environment 105 to adopt.

Example IoT Implementation for Policy Determination

Figure 3:
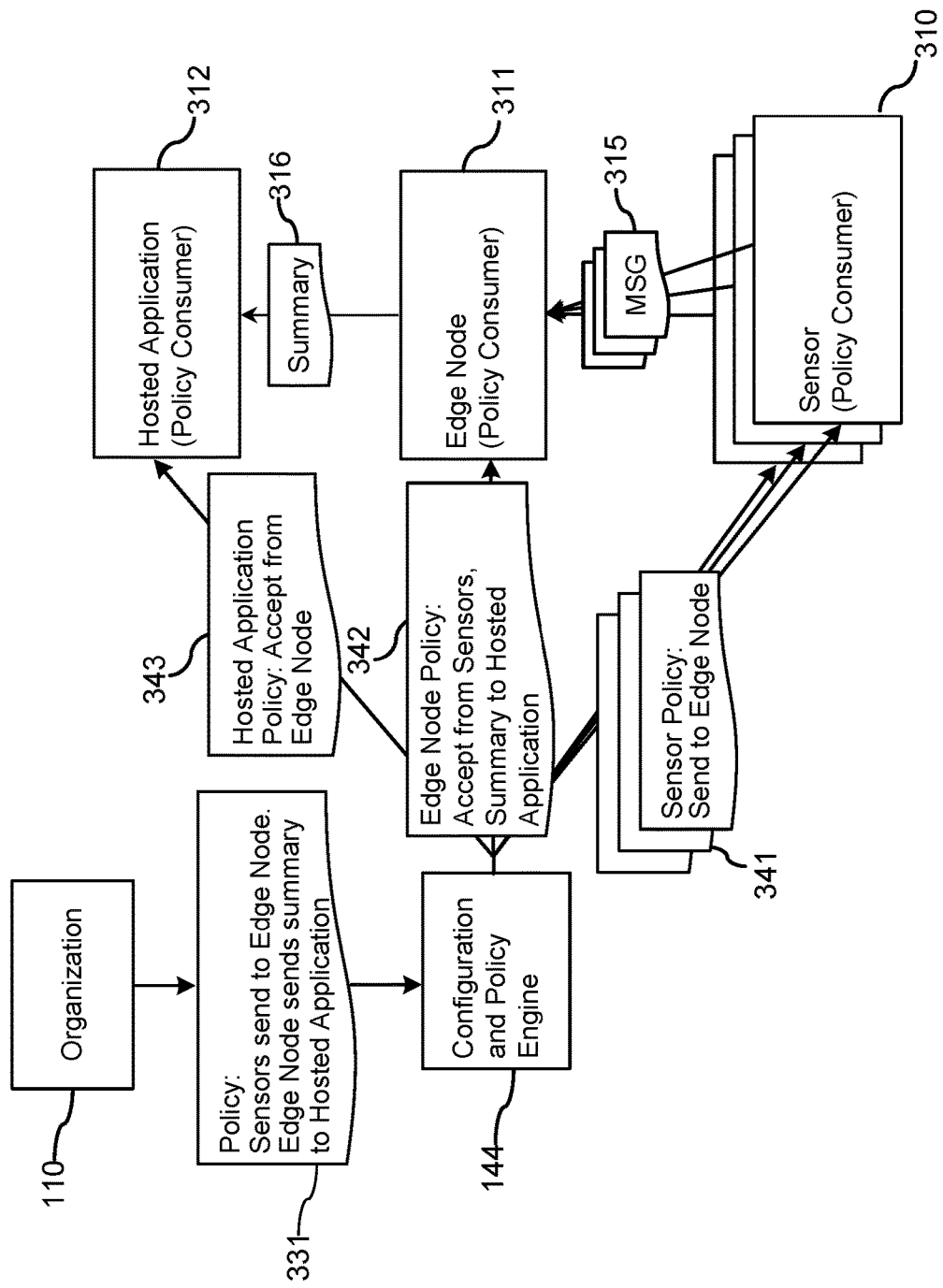
FIG. 3 is a block diagram that shows an IoT embodiment related to automatic policy determination and distribution, in accordance with some embodiments.

FIG. 3 is a block diagram that shows an IoT embodiment related to automatic policy determination and distribution, in accordance with some embodiments. The configuration phase begins with an organization 110 sends a business policy setting 331 to the configuration and policy engine 144. The business policy 331 specifies that the IoT sensors 310 can send messages to the edge node 311, which, in turn, can send a summary of these messages to the hosted application 312.

The configuration and policy engine 144 translates the business policy 331 into rules and sends a portion of those rules to each of the entities. To the sensors 310, the configuration and policy engine 144 sends a sensor policy 341 indicating that the sensors are to send their messages to the edge node 311. To the edge node 311, the configuration and policy engine 144 sends an edge node policy 342 indicating that the edge node 311 can accept messages from the sensors 310 and send a summary of those messages to the hosted application 312. To the hosted application 312, the configuration and policy engine 144 sends a hosted application policy 343 indicating that it can accept messages from the edge node 311.

The messaging phase begins with the sensors 310 sending messages 315 to the edge node 311, in accordance with the sensor policy 341. For example, in an environmental monitoring system, multiple outdoor environmental sensors might send messages to the edge node indicating the sensor location, the level of ambient light, barometric pressure, and/or temperature. In a facility monitoring system, the sensors may be cameras which transmit a series of pictures of points of ingress and egress to a building (the edge node).

Having received these messages, the edge node 311 generates a summary 316 of the messages, and sends this summary to the hosted application 312, in accordance with the edge node policy 342. Continuing with the prior example of an environmental monitoring system, the edge node may take an average of atmospheric conditions, grouped by geolocation, and transmit these averages to the hosted application (for example, a server managed by the owner of the area being monitored). With a facilities monitoring system, the edge node may apply an algorithm to perform facial recognition on the images transmitted by various cameras, and send messages to the hosted application with the names of identified individuals and timestamps for ingress/egress, for the purpose of tracking time and attendance.

The hosted application 312 accepts this summary in accordance with the hosted application policy 343. In an embodiment, the hosted application 312 authenticates the summary 316 from the edge node 311, and then checks for authorization by ensuring this identity and associated context are within policy 342, querying the configuration and policy engine 144 directly if there is insufficient information locally, and then handling the message per policy.

The sensors 310 and the edge node 311 may both be policy consuming devices 136 that receive business policies in the form of interaction control list indicating which entities to trust for receiving messages, and named entity devices that send messages (the messages 315 and the summary 316, respectively) to another policy consuming device 136 (the edge node 311 and the hosted application 312, respectively).

More Examples System Method Implementation

Figure 4:
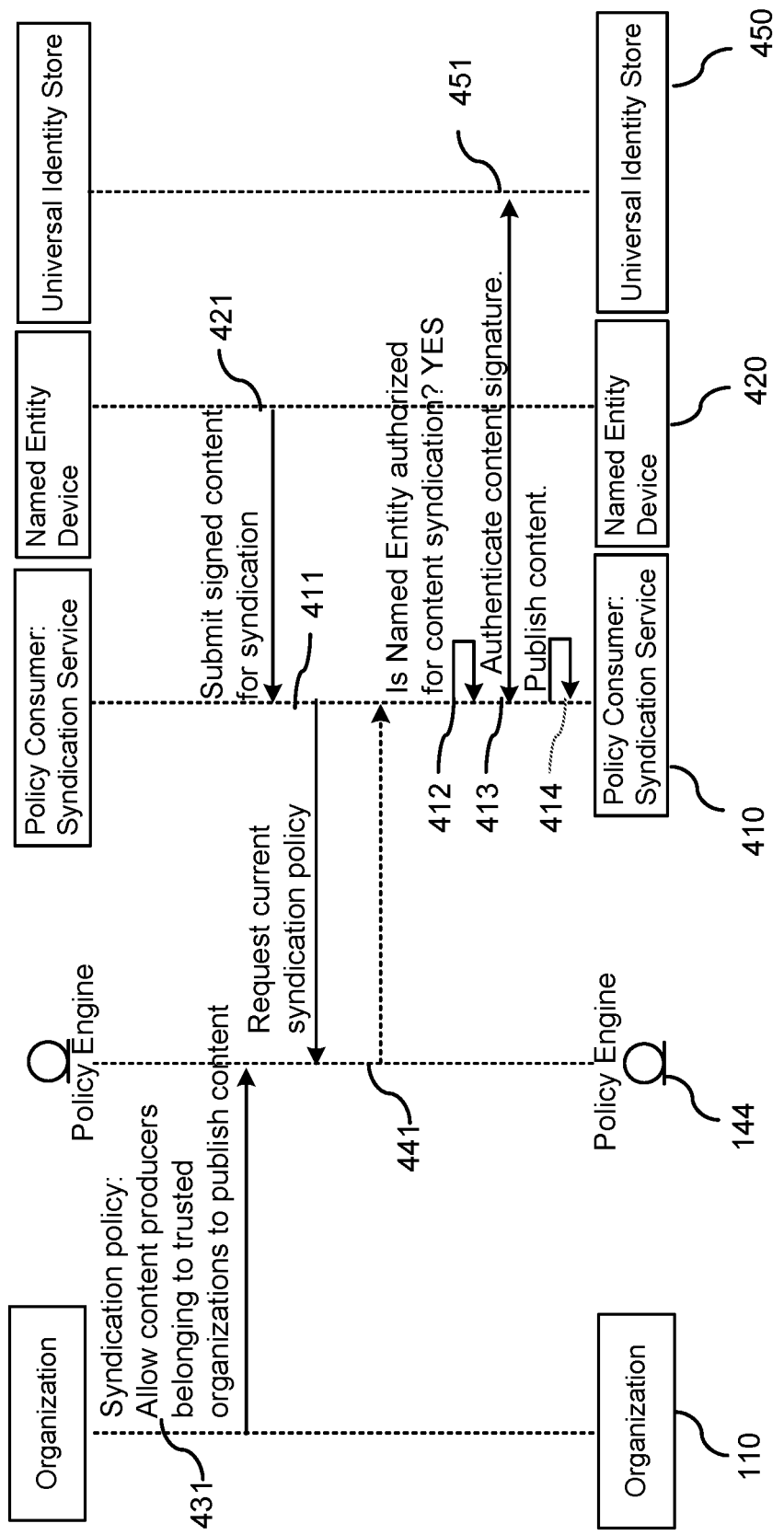
FIG. 4 shows an embodiment of both configuration and messaging methods, in accordance with some embodiments.

FIG. 4 shows an embodiment of both the configuration and messaging methods of the example system discussed above. In the configuration stage, the organization 110 transmits a business policy setting 431 to the configuration and policy engine 144. The configuration and policy engine 144 can build rules based on this information provided by the organization 110. Using these rules, the configuration and policy engine 144 may present an interaction control list to the policy consuming device which enables the policy consuming device to make a decision on whether or not to syndicate content from the named entity.

In the example of FIG. 4, the business policy 431 sent by the organization 110 reads: "allow content producers belonging to trusted organizations to publish content."

In the messaging phase, a named entity device 420 transmits signed content 421 to the syndication service 410. The signed content 421 contains a signature for the content as well as the name which can be used to locate a credential in the universal identity service 450. On receipt of the request 421 from the named entity device 420, the policy consumer device 410 may refresh its internal policy (steps 411 and 441) with a new copy of the policy from the configuration and policy engine 144. In the example, the configuration and policy engine 144 replies 441 with a list of named entities which are authorized to publish content.

The policy consumer device 410 may now make a determination 412 as to whether the named entity device 420 is authorized to publish content by matching the named entity's name against the list of permitted entities in the syndication policy.

If the named entity is allowed to publish content via the syndication service, the syndication service uses the universal identity store to perform content authentication 413 using, for example, delegated authentication service engine 210 and if the content authenticates, the syndication service then publishes the content 414.

Another embodiment of FIG. 4 may involve a news syndication service, where members of related organizations are permitted to use the syndication service 410. The named entity device 420 may be identified by a name in DNS where a public key can be located, and the policy 431 may include the specific DNS names of permitted named entities, and/or a list of DNS prefixes identifying permitted parts of the namespace, whereby a match of the parent organization permits the named entity 420 to publish via the syndication service 410.

In an embodiment, the news organization gives each of its journalists and editors a unique key in DNS, and their articles are signed with this key. When a journalist or editor publishes an article, so long as one of the appropriate keys is used to sign the message, the article will be syndicated. This prevents a sports journalist from accidentally posting to, for example, the local news page, unless the local news editor has also signed the message.

In another example, a first news outlet might syndicate stories from a list of trusted sources, such as other news outlets. Any content not signed by one of these organizations, even if it were to authenticate properly, would not be authorized for automatic syndication, and could be rejected per policy or per policy sent to an editor for review.

Figure 5:
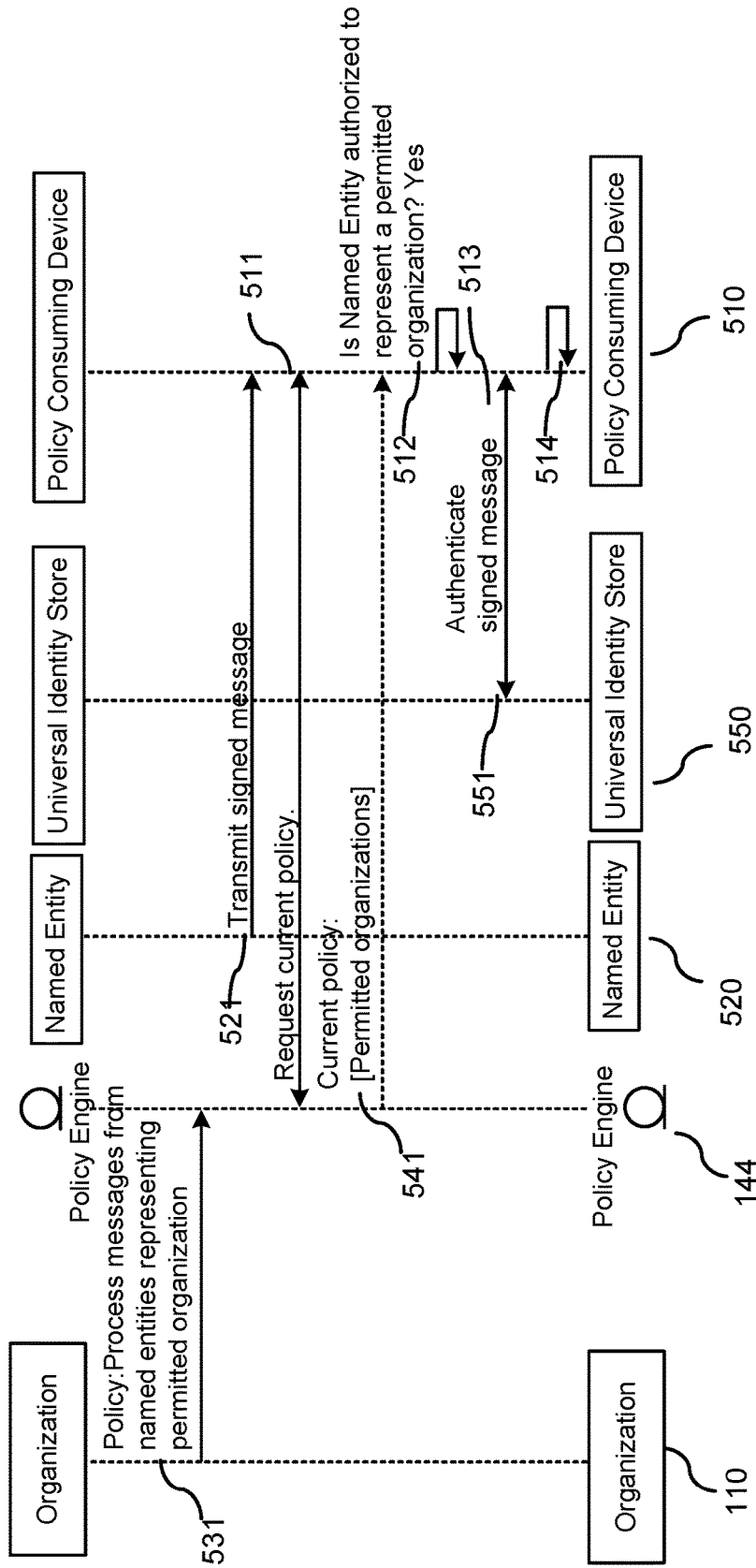
FIG. 5 shows an embodiment of a policy consumer device receiving, authenticating, and authorizing messages from a named entity device, in accordance with some embodiments.

FIG. 5 shows an embodiment of a policy consumer device 510 receiving, authenticating, and authorizing messages 521 from a named entity device 520. In the configuration phase, the organization 110 submits business policy settings 531 to the configuration and policy engine 144. The business policy permits the policy consumer device to process messages from named entities device representing permitted organizations.

In the messaging phase, the named entity 520 broadcasts an authenticated message 521 which is received by the policy consumer device 510. The policy consumer device 510 may or may not also be a named entity. If the policy consumer device 510 is a named entity, it also has a corresponding member 235 within a role 234 within the configuration and policy engine 144 in order to retrieve perspective-based policy from the configuration and policy engine 144. The perspective-based policy may be a subset of the entire policy that is tailored for the policy consumer 510.

If the policy consumer device 510 is not a named entity with a member entry within a role within the configuration and policy engine 144, the only perspective offered is that of what the organization 110 has defined as acceptable for public consumption. This can be an "anonymous access" mode. In that dynamic, there is a default published policy which describes access for a specific purpose, in a manner that is generally useful to any client that might receive a message from a named entity. Note that this anonymous access mode can assist with new unconfigured devices that are attempting to bootstrap their way into participating in the application environment 105.

This is the case in the example in which an automobile 510 (an example policy consuming device) may encounter authenticated messages 521 from connected roadway equipment 520. The automobile 510 may retrieve 511 a policy 541 from the government agency (by querying 511 the policy engine) responsible for publishing a list of organizations which are allowed to operate connected roadway beacons. Those organizations may further subdivide and organize their part of the universal namespace to indicate the geographic area or type of equipment presenting itself as a named entity.

The automobile may periodically refresh its policy based on the regions within which it is expected to travel and use that list of allowed entities or organizations to determine from which entities the automobile should process messages. In some cases, it may make sense to determine the authorization 512 of a message sender before authenticating a message 551, especially if the list of allowed named entities is short and the process by which the message contents are authenticated is computationally expensive (like using asymmetric cryptography to process message signatures). Authorization may or may not happen before authentication, depending on which is the least expensive from the perspective of computation and network bandwidth consumption.

Figure 6:
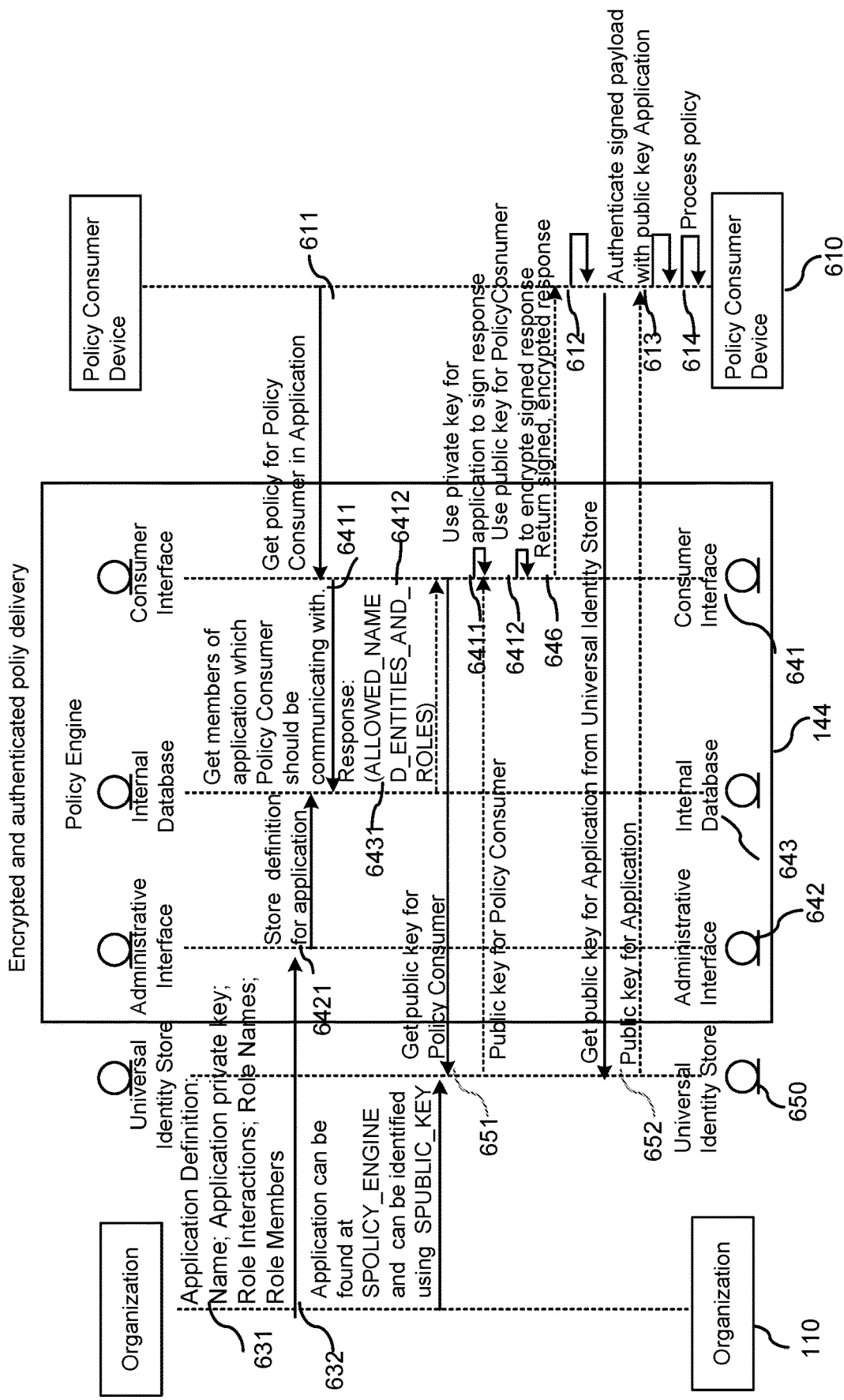
FIG. 6 illustrates an embodiment of authorization determination where the policy consumer is a named entity, in accordance with some embodiments.

FIG. 6 illustrates an embodiment where the policy consumer is a named entity. Dynamic policy may be delivered encrypted and authenticated. In this case, the organization 110 configures application parameters like name, role names, role interactions, and role members, as well as the name of the application (in the universal identity store) and the application's configuration signing public key.

The policy consumer device 610 requests the current policy from the configuration and policy engine 144, via the consumer interface 641. The consumer interface 641 communicates with the internal database 643 of the configuration and policy engine 144 to construct a targeted policy, which represents only the entities and corresponding roles that the policy consumer device 610 is authorized to communicate with. The consumer interface 651 uses the application's private key to generate a signature of the generated policy. The consumer interface 641 then uses the public key associated with the policy consumer device 610 (retrieved from the universal identity store 650) to encrypt the signed policy, which is then transmitted to the policy consumer device 610.

The policy consumer device 610 uses its private key to decrypt the response. The policy consumer device 610 then retrieves the public key associated with the configuration and policy engine 144 to authenticate the signed policy, thereby confirming the authenticity of the policy. Having confirmed the authenticity of the policy, the policy consumer device 610 may now process and apply the policy to future communication within the application.

In this embodiment, the response from the configuration and policy engine 144 is an encrypted message, regardless of transport. This is useful for environments where an encrypted session directly between the policy consumer device 610 and the configuration and policy engine 144 may not be possible. The policy consumer device 610 may rely on the message to be delivered by a variety of transports, queueing and message brokering technologies, or even physical media.

The configuration and policy engine 144 may provide a RESTful interface, or it may operate as a client for a message brokering service, or queueing system. The embodiments described herein are transport-independent, and may employ a system for encryption and authentication as described in FIG. 6 to overcome the security challenges of communicating authorization policy over de-coupled infrastructure, where message delivery infrastructure may not be under the direct control of the organization, like with email and queueing and message brokering middleware.

The DNS may also be replaced by, or used in conjunction with, other public databases. While DNS is used as the primary namespace through which public key discovery occurs, the same functionality can be implemented via another technology, such as IPFS and ENS. IPFS/ENS may also be used for the secure distribution of policy, applying message-oriented security (e.g. source-signing and encrypting for the recipient) to a file containing the policy. The policy may then be stored in IPFS and the ENS record may point to the most recent copy of the policy. The same principle may be applied to the discovery of the named entity's public key.

Example Implementation: Traffic System

In an example, an autonomous vehicle begins a journey which it takes from the state of Nevada to the state of California. Upon establishment of the route, the automobile may query the national department of transportation and request the namespace prefixes (more specifically, DNS zones or namespaces within) used for representing the identities of roadside beacons in the states of Nevada and California. From this prefix list, the automobile knows to only attempt to authenticate and process messages coming from beacons matching the namespace prefix of the departments of transportation which govern the roadway along the automobile's route.

Example Implementation: Hospital

In an example, a wheeled patient vitals monitor in a large hospital environment may be operational in one of many locations, whereby each location has a system for receiving and processing patient vitals. In order to accommodate limited storage capacity on the vitals monitor as well as the receiving system, and due to the highly dynamic nature of equipment migration in a hospital environment, policies are delivered to devices on a need-to-know basis. In this case, "need-to-know" means "need to communicate with".

Devices which participate in an application may publish certain aspects of their geographic or network-logical information either in the DNS, or directly in the policy system. Whether the device publishes this information in the DNS or in the policy system itself is a trade-off between security and simplicity. If the device publishes this information in the DNS, it is visible everywhere, just by knowing the device's name. This allows for a single source-of-truth. If information about device location is considered sensitive information, then the device may periodically update its location with the policy server, which does not reveal information without authorization. In an embodiment, the hospital uses a private DNS system which resolves names only within the hospital network itself, and the 3PSP can also function in this delegated private namespace.

In this example, patient vitals are collected on a per-wing basis. There is only one policy server for the entire hospital. The patient vitals monitor is powered down and moved from the oncology wing to the emergency room. When the patient vitals monitor is powered on, it announces its location to the central policy server. The central policy server, now knowing that the monitor is in the emergency room, informs the monitor that it should be communicating directly with the emergency room vitals monitoring system. The vitals monitor attempts to establish trusted communication with the emergency room vitals monitoring system, and is unable to, because the emergency room vitals monitoring system has not refreshed its policy since the time that the monitor was moved to the emergency room. Alternatively, or additionally, the central policy server may process messages from the hospital's network infrastructure which indicate the physical location of the patient vitals monitor.

In response to communication from an untrusted entity, the emergency room vitals monitoring system may trigger a policy update, instead of waiting for the regular polling period. Rate-limiting should be applied on a per-unknown-entity basis, so that anomalous behavior on the part of one unrecognized device does not consume too many resources and impact the ability of the policy server to serve requests.

In environments with appropriate levels of connectivity, power, and compute resources, a technique like long-polling or web sockets may be used to allow the policy server to immediately update policy consumers in the event of a business policy change. This can be especially beneficial as it permits the policy server to manage the load of disseminating policy across a massive fleet of devices. In the absence of a policy server-driven update method like this, controls (like rate-limiting and back-off logic) must be employed to prevent excessive load on the third-party server's infrastructure.

Example Implementation: Satellite System in Outer Space

Satellite constellations grow in the number of participants over time, as more coverage becomes necessary for various applications. This presents an interesting challenge for trust lifecycle events, especially for satellites with constrained connectivity and computing resources. A satellite may remain in orbit for years and need to authenticate direct communication from a new constellation member.

Instead of retaining a copy of all public keys from all satellites in the constellation, a satellite may periodically query the terrestrial service to update the cache of public keys for the other constellation members it is expected to encounter in its orbit. This enables savings on storage hardware on the satellite itself, as well as a savings on the expense of transferring information to and from orbit. The satellite only gets exactly the information it needs, and the dynamic nature of this communication policy is governed by the managing application on the ground.

In cases where the contents of satellite-to-satellite communications must be highly-secured and the broader constellation needs to be isolated from abuse in the event a single satellite is compromised, this invention is especially useful. The satellite knows only its direct communication partners, and no other identities are known by the satellite to be trusted. This allows a tight compartmentalization of failure zones, where a compromised satellite may not know of all other satellites in the constellation, because credential discovery and the identities of constellation members are distributed only granularly, on a need-to-know basis.

Example Implementation: Privacy Protection Implementation

A privacy protection implementation is similar to the IOT use case, in which the third-party server 140 stores keys for users in the DNS. However, in this use case, for reasons of privacy, the user's DNS label is a hash of the username, not the username itself. With this additional protection, policy can be set across both the domain and user, and the hashed portion of the DNS name allows the reduction of characters which are otherwise unsupported by the DNS namespace into a form which is DNS-compatible. This way, the third-party server 140 can manage permitted users across the organization, or users themselves can choose which other users (either from their own organization or external ones) to trust. The policy engine may present a more readable representation of the user identity to the technical administrator, and perform the hashing against the name in order to align with the true DNS names, before constructing and distributing interaction control lists.

Example Implementation: Non-IoT Implementation

In the case of an online news publishing system, where a newly-acquired business may need to publish news on the parent company's web site. In FIG. 11, the organization 110 may configure a policy to allow all subsidiaries to publish by business unit. The policy engine may use a legal entity registry to determine the relationship between organizations and domains, and between an organization and other organizations. An authenticated user representing the business division of example.net (yogi.bear@business.example.net, a named entity) attempts to publish an article in the business section of example.com news (another named entity). The organization 110 has configured the policy engine to permit the members of subdomains of any business owned by the parent company, example.com news, to self-publish on the example.com news website. When yogi.bear@business.example.net attempts to publish an article in the business section, the policy engine makes the determination on whether they are authorized to do so by comparing the domain of the named entity (business.example.net) against a list of companies owned by example.com news. In this example, the list of allowed domains is derived from a database external to the organization. Since the right-side domain matches with a name on the list of owned domains, and the next label in the name, "business", is the proposed section for the article's publication, publication is permitted because "business" is recognized as a news column in the parent company.

Example Implementation: Role-Based Access to Software and Configuration Updates

In some cases, authorization policy may be used to allow access to specific resources or software assets. In an embodiment, an authenticated device requests a current copy of its configuration from a configuration management system, which may be part of the third-party server 140 or a server provided by an organization 110. The configuration management system treats system configuration as a versioned digital asset which is periodically revised or updated, and each new revision has a unique identifier. Devices of a similar purpose and behavior may have identical configuration. Due to the complexity of handling identical configuration settings for a great number of devices, configuration distribution may more easily be accomplished using a channelized distribution model, where multiple identical devices subscribe to a channel for configuration updates, where all subscribers of a channel are expected to use the exact same configuration information. The configuration management system queries the policy engine to ascertain the versioned asset channel that the device's identity is associated with. In this example, the versioned asset channel presents the latest version of the configuration file. The configuration management system is then able to return the specific configuration that the device is entitled to, or return an 'unauthorized' error message in the event the authenticated device is not authorized to access the update service.

Example Implementation: Publication Policy

The news business provides an example of the need for continual refinement of context. In this example, an online news publisher publishes a public key and contextual authentication record in DNS for every author and editor. In the publication process, the news publisher adds topical tags (sports, international, business) to the story, as well as signatures for the author(s) and editor(s). The contextual references may contain topics for which the news publisher endorses the authors and editors as experts. This allows any consuming system to not only authenticate the organization and the individuals producing the content, but also the expertise of the individuals producing the content, this being an embodiment of inherited trust (trust in an individual based on the organization they're authorized to represent).

This can be used for detecting when sports writers decide to contribute to the weather column, and it can even be used in the news publisher's internal publication workflow system to apply more scrutiny (or automatically invite an expert to contribute) to an article related to a topic for which the author(s) and editor(s) are not experts.

For instance, a system may trust our local weather people on TV to report the weather, because they're certified by the American meteorological society. The system may not trust them to report on local sports, though. The system may trust the weather channel to aggregate weather reports, and the system trusts the weather channel to analyze external weather reports for quality. The system may not expect the weather channel to syndicate news about the local poker tournament.

If the weather channel syndicates a local TV station's weather report, it will be received with high confidence. If the weather channel syndicates a local TV station's high school football rankings, the audience might be confused (low confidence) and ignore the information, or change the channel. (MM machines start replaying messages from connected roadway equipment. The consuming application should discard it, and notify the responsible party)

If a dubious reporter of world news produces a special report about the weather, a system should not trust it (untrusted edge and unauthenticated information should be ignored). If a dubious reporter of world news reproduces an authentic weather report word-for-word, a system may trust the details of the weather report, but not any information offered as context or commentary. The system should still change the channel.

Example Implementation: DARTH (Device Adjacency and Relative Topography)

The third-party server 140 may provide dynamic and specific response to a policy query by generating an interaction control list whose information is selected based on relevant metadata given the context. While the discussion in this embodiment related to DARTH (device adjacency and relative topography) is described using the contextual information of geographical locations, the dynamic generation of the interaction control lists may be based on various types of contextual information such as geographical location, time stamp, computation capacity, load balancing metadata, duty cycle, telemetry data, status of the devices, network capability of the devices (e.g., whether the device is equipped to communicate in a certain network protocol), and other suitable metadata of a device. In application environments where devices are subject to storage, network, or computation constraints, the third-party server 140 may transmit only relevant information in interaction control lists that each device needs in order to operate. This is in contrast to methods which may inform a device of all possible interaction partners or all members of an application via a static policy.

The third-party server 140 may use metadata associated with various devices to determine a relevant interaction control list and provide the list to a policy consuming device 136. By way of an example embodiment, devices may be organized by role and the communication methods used by devices may be constrained by locality. An example is a system where a large-scale fleet of lightweight autonomous vehicles travel over long distances and need to communicate directly with one another for collision avoidance and other cooperative behavior. Each autonomous vehicle (a policy consuming device 136) may have two communication methods: point-to-point (vehicle to vehicle) and a satellite Internet connection which provides limited connectivity and is more expensive to use. The third-party server 140 may store last known metadata, such as geolocation, in association with each role member. The autonomous vehicle periodically updates its own metadata with the third-party server 140, using the satellite link. Since the autonomous vehicle has a public key in DNS, the updates can be authenticated by singing the update message. As the autonomous vehicles periodically retrieve their latest policies from the third-party server 140, via the satellite link, the third-party server 140 may take into account the last known metadata of other application participants that each autonomous vehicle may be within range of and need to communicate with. The third-party server 140 uses the geolocations of the autonomous vehicles to construct an interaction control list that contains a list of expected adjacent application members, instead of a list of all application members. This allows the application owner to minimize the use of bandwidth for policy updates, minimize the use of storage in the autonomous vehicle's onboard memory, and minimize the compute resources required to compare authenticating entities against a list of allowed communication partners. The policy engine may also use the autonomous vehicle's public key to encrypt the response from the third-party server 140, thus preventing disclosure of any information of other devices that are included in the response to the public.

The autonomous vehicles periodically update policy from the third-party server 140. The autonomous vehicles may use a system as described in the delegated authentication service engine 210 to authenticate messages from other autonomous vehicles over point-to-point links. Furthermore, a third-party server 140 may be used for further automated control over policy contents, building the interaction control lists for each device based on a variety of entity metadata, like geolocation, the taxonomic classification of the policy role members, or even the time period that certain entities are expected to be active.

Figure 8A:
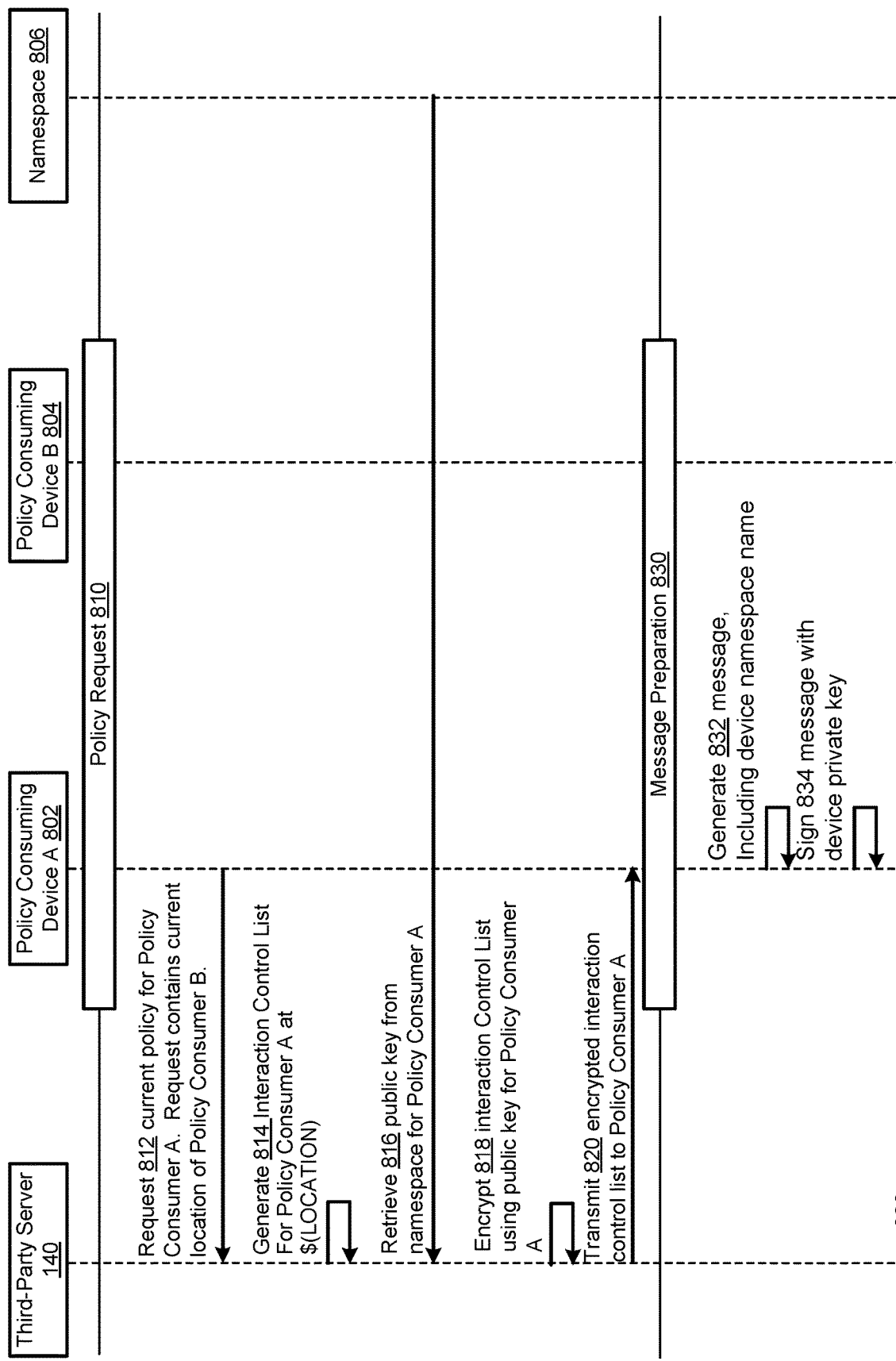
FIGS. 8A and 8B, combined, depict a flowchart illustrating a dynamic interaction control list generation process, in accordance with some embodiments.
Figure 8B:
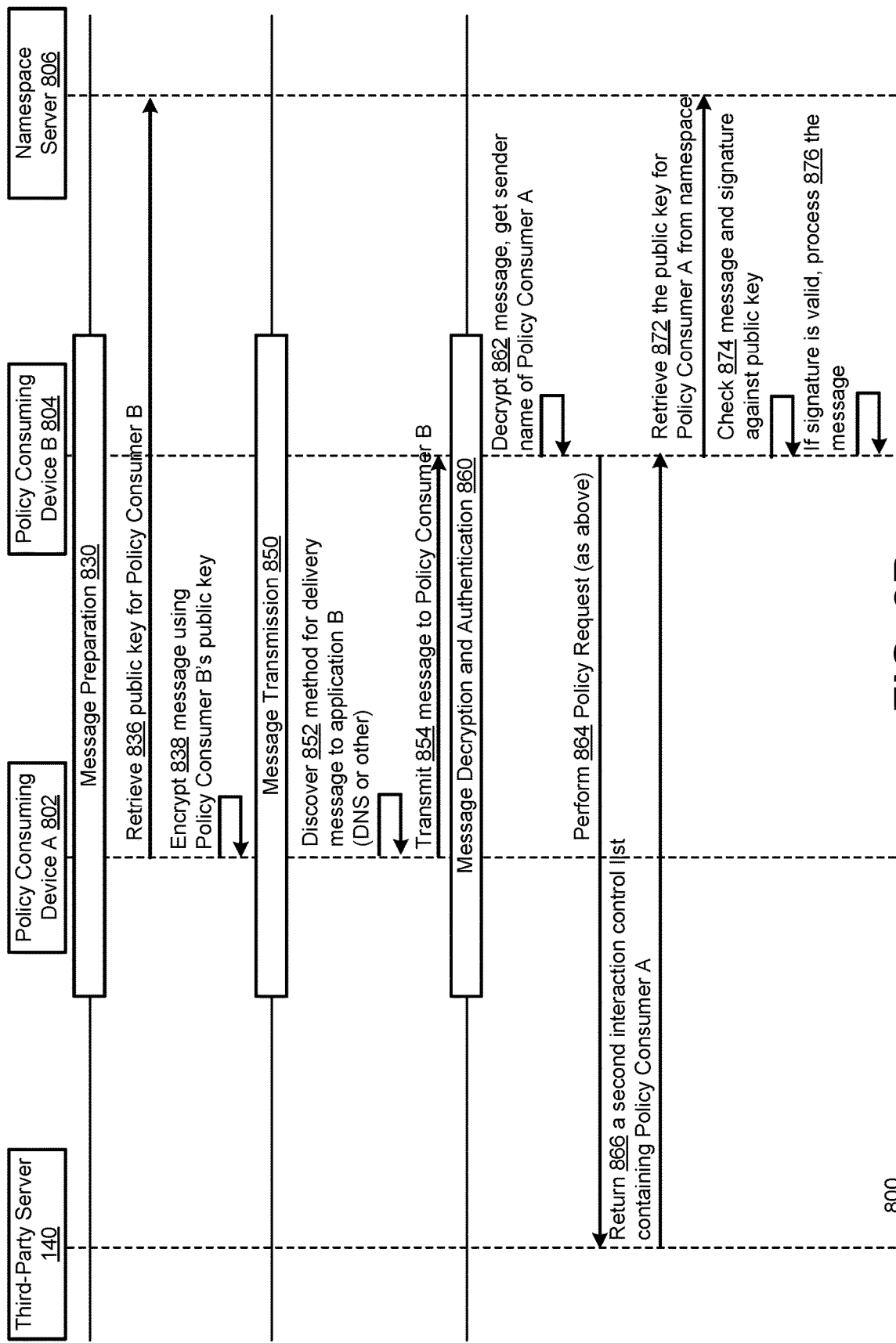

FIGS. 8A and 8B, combined, depict a flowchart illustrating a dynamic interaction control list generation process 800 under an implementation of DARTH, in accordance with some embodiments. While the process 800 is described with two devices interacting with each other, the same principles may be extended to communications among three or more devices. At a high level, the third-party server 140 examines metadata of the devices and other related contextual information. The third-party server 140 in turn provides a dynamic interaction control list that includes specific and relevant information relevant to the device seeking the authorization information. In the process 800, the policy consuming device A 802 and the policy consuming device B are examples of policy consuming devices 136. The namespace 806 may be part of the namespace 112 or the delegated namespace zone 142.

The process 800 may be a process performed by the third-party server 140 for managing an application environment. An administrator of the application environment may set a context-based policy for the application environment. For example, the context-based policy may be a proximity-based policy. The third-party server 140, based on the context-based policy, stores various configurations to achieve the policy in the configuration and policy engine 144.

In a policy request phase 810, the policy consuming device A 802 may request 812 current policy for policy consuming device A 802. The request may contain the current location of the policy consuming device B 804 and other contextual information related to the device B and the current transaction. The third-party server 140 may generate 814 a specific interaction control list for policy consuming device A at a particular location. The interaction control list may be selected based on the particular location. For example, the interaction control list may be a list of devices that have the tag of a role that is authorized to communicate with the policy consuming device A. The devices that have such a tag may constitute a long list. The third-party server 140 further filters the list by the contextual information such as the geolocation of the policy consuming device A. In this example, the geolocation of the policy consuming device B indicates that the device B is within a threshold distance from the device A and the device B is one of the devices with the tag. As such, the interaction control list includes the device B.

The third-party server 140 retrieves 816 the public key of the policy consuming device A from the namespace 806. For example, the public key may be part of the identity record 146 that is stored in the DNS as discussed above in association with FIG. 2. The third-party server 140 uses the public key to encrypt the generated interaction control list. The third-party server 140 in turn transmits 820 the encrypted interaction control list to the policy consuming device A.

In a message preparation phase 830, the policy consuming device A 802 receives the encrypted interaction control list. The policy consuming device A 802 uses its private key to decrypt the interaction control list and determines that it has the authorization to perform certain actions. The authorization to perform actions for the policy consuming device A 802 may be the authorization to communicate with the device B, take an action in response to receiving a message from device B, or any appropriate authorization. The policy consuming device A 802 generates 832 a message that is intended to be transmitted to the device B to initiate the transaction between device A and device B. The message may include the namespace name of the policy consuming device A 802, such as the DNS name. The namespace name allows the policy consuming device B 804 to retrieve identity record 146 to authenticates the policy consuming device A 802.

The policy consuming device A 802 signs 834 the message with the private key of the policy consuming device A 802. The signature allows the policy consuming device B 804 to authenticate the message and device A. Continuing to FIG. 8B, the policy consuming device A 802 retrieves 836 the public key of the policy consuming device B 804 from the namespace 806. The policy consuming device A 802 in turn encrypts 838 the message using the public key of the policy consuming device B 804.

In the message transmission phase 850, the policy consuming device A 802 discovers the method for delivery of the message to policy consuming device B 804. The policy consuming device A 802 may determine 852 the method for delivery based on the type of device of device B. The method of delivery may be saved in the interaction control list, stored locally with device A, or with another source such as the third-party server 140 or an organization 110 operating the device B. The policy consuming device A 802 transmits 854 the message to policy consuming device B 804.

In the message decryption and authentication phase 860, the policy consuming device B 804 receives the message from device A and will need to determine whether the policy consuming device B 804 has the authorization to interact with the device A. The policy consuming device B 804 may first decrypt 862 the message using its private key and obtain the sender name of the policy consuming device A 802 included in the message. The policy consuming device B 804 may perform 864 a policy request to the third-party server 140. The policy request will be similar to the process discussed in the policy request phase 810 as discussed above except the request is transmitted from the policy consuming device B 804. The third-party server 140 returns 866 a second interaction control list containing the policy consuming device A 802. Again, the generation of the second interaction control list may be based on contextual information to select specific devices that are relevant to the device B.

Upon determining that the policy consuming device B 804 has the authorization to interact with the policy consuming device A 802, the policy consuming device B 804 retrieves 872 the public key of the policy consuming device A 802 from the namespace 806. The policy consuming device B 804 then checks 874 the message and the signature using the public key of the policy consuming device A 802. If the signature is valid, the authentication is successful. The policy consuming device B 804 in turn processes 876 the message and continues whatever the interaction it is with the device A.

The DARTH process may have broad applications in different areas. For example, in an IoT application, some devices may communicate primarily through a message broker or a network node that may be responsible for managing communications within a certain geographical area of the network node. To limit the number the number of device identities that need to be included in an interaction control list to be provided to the network node, the third-party server 140 may filter the device based on the metadata of geographical locations of devices. If a device has been moved by a malicious party, the device will not have the authorization to communicate with the network node anymore even if the authentication based on the identity of the device on the DNS is successful. Again, while geolocation is used as an example for the metadata that the third-party server 140 may use to filter devices in the interaction control list based on other types of contextual conditions such as time, capacity, metadata tags, etc.

The DARTH process may also be used for load balancing, such as in the area of cloud computing or edge computing. The metadata used may be a metric that measures the capacity of a computing server such as a counter that counts the number of the tasks that the computing server is performing and the memory or CPU usage of the computing server. If a server is almost full in the capacity, the third-party server 140 may filter out the server in the interaction control list so that devices that newly request computing services will not have the authorization to communicate with the server. The third-party server 140 may put the server back to the interaction control list when the server is no longer as busy.

Example Implementation: Secured Update

In an embodiment, a named entity and policy consumer needs to securely discover its permitted communication policy. The named entity device and policy consumer device in FIG. 7 may be called client1.example.com.

The organization 110 uses the administrative interface to define the application, as well as the roles and role members in the policy engine. The technical administrator also configures the universal identity store with information necessary to discover and authenticate the policy engine. Finally, the technical administrator configures client1.example.com to know that the name of the application that it's participating in is app1.example.io.

The named entity device and policy consumer device client1.example.com queries the consumer interface, and requests the permitted communication policy.

The consumer interface queries the internal database to build a document describing the roles and named entities that client1.example.com should communicate with. The consumer interface then retrieves the public key for client1.example.com from the universal identity store. The consumer interface signs the policy document with its own private key (which is associated with its name, in the universal identity store), and encrypts the signed document using the public key associated with client1.example.com. The signed and encrypted response is returned to client1.example.com.

The response is decrypted by client1.example.com, and client1.example.com authenticates the signed policy document using app1.example.io's public key, retrieved from the universal identity store.

The part of the process involving client1.example.com is repeated by every member of the application, and each only receives from the policy engine the exact part of the policy that's relevant to the policy consumer.

Example Implementation: Using Policy to Authorize a Composite Entity

In an embodiment, a collection of devices must be authorized as a single entity. A person with a car (named entity) and a cell phone (named entity) enters into a contractual agreement with a parking garage management company (policy consumer). The contract stipulates that the person is only allowed to park one designated car in the garage, and the person must be present when the car enters and leaves the garage.

The parking garage management company has placed intelligent sensors at points of ingress and egress in the garage. The intelligent sensors are capable of communicating with the policy engine and nearby radio-enabled devices.

The car has a radio-enabled device onboard, which is capable of authenticating with devices like the parking garage's intelligent sensors. The person's cell phone is also capable of authenticating with the parking garage's intelligent sensors.

When the person establishes a relationship with the parking garage company, the person gives the parking garage company the universal names of the cell phone and the automobile, which are discoverable via the universal identity store. The parking garage company's technical administrator associates the universal names of the car and cell phone with the contract, in the policy engine.

When the car attempts to enter or exit the facility, the intelligent sensor detects the car's attempt to authenticate and makes a request to the policy engine, for all required named entities associated with the car. The policy engine replies with the universal name of the cell phone, and the intelligent sensor only allows the car to pass if the intelligent sensor can also authenticate the cell phone. Since the intelligent sensor can only authenticate devices within a close proximity, authentication of the cell phone confirms its physical presence at the same site where the car is detected.

In some embodiments, it may be desirable to create a feedback loop for authorization or authentication failures, to detect attempts at system abuse. In these cases, the policy engine may be used to indicate a responsible party and a method for reaching that responsible party. In the prior embodiment where an intelligent sensor detects and authenticates nearby devices, a bad actor may desire to impersonate a legitimate cell phone for the purpose of gaining access to the parking garage while only being in possession of an authenticated car. The Tech Admin may configure a reporting email address which allows the intelligent sensor to notify the application owner of partial authentication failures, where at least one, but not all, required devices were successfully authenticated. This can allow the application owner to identify and react to users and locations which are more prone to attempted fraud.

Example Implementation: Using Dynamic Policy in Content Curation

Figure 7:
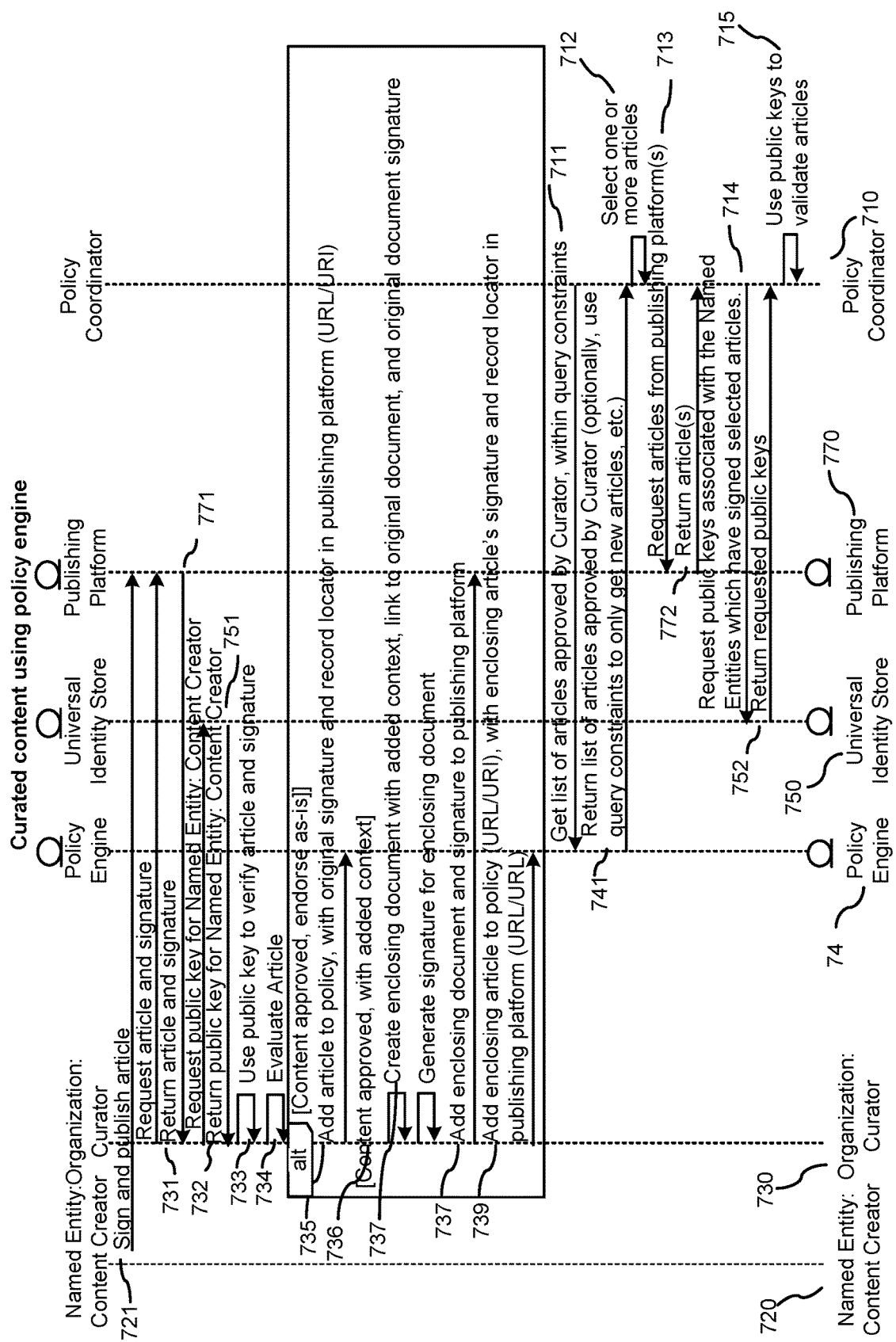
FIG. 7 illustrates an embodiment of authorization determination where content producers and content curators are named entities, and the policy consumer is not a named entity, in accordance with some embodiments.

FIG. 7 illustrates an embodiment where content producers and content curators are named entities, and the policy consumer is not a named entity, we may use the policy engine to represent the content which has originated with a content producer, if it has been approved by a content curator. In this case, the policy consumer trusts the content curator to evaluate the content from various content producers.

The content curator manages the policy, which contains references to approved content. The policy consumer subscribes to the content curator's dynamic policy, and then may discover approved content via the content curator's dynamic policy.

The policy may be cryptographically signed, and validated by using the content curator's public key. The content curator may also add notes or contextual information to the curated content, and the resulting document, which contains the original content and the content producer's signature, may contain the content curator's notes and a cryptographic signature covering the original document and the content curator's notes. The content curator is a customer of the third-party server 140, which offers a management interface for the content curator as well as an interface for the policy consumer. In some cases, the policy consumer may be a named entity, and the policy may be securely delivered by encrypting the policy for the policy consumer's public key.

Example Implementation: Using Policy to Securely Deliver Abuse Reports

Third-party server 140 may be the policy consumer, and sometimes the named entity described in the policy. Using the concept of the 'anonymous user' the third-party server 140 may publish a URI which describes where an abuse report may be sent. This may take the form of an email address or the URL of a HTML form in a well-known format in a TXT record. This allows the application owner to direct abuse reports to the parties responsible for specific devices, and may be derived from the policy configuration for the application. More specifically, the tech admin configures an abuse reporting URI, in connection with the application, or a specific role. The DNS server representing the device identities is a policy consumer. The DNS server requests the policy from the policy engine, and receives a list of identities and associated abuse reporting URI(s), which are then represented in DNS. In the case of multiple roles attached to a device, there may be multiple TXT records, representing multiple responsible parties.

Using a third-party server 140 as a delegation service for authorizing messages has various benefits over the organization 110 performing the authorization because: (1) third-party server 140 sees a lot more parties than does the client, since the third-party server 140 is providing this service for many other clients (2) researching the reputation of a new party is too onerous for the client, and the third-party server 140 is better situated for this because it sees the widest span of parties, good and bad (3) when business policies change or evolve, propagating the effects of these changes can be too much for the client, so using the third-party server 140 to propagate the changes is much easier.

Computing Machine Architecture

FIG. 9 is a block diagram illustrating components of an example computing machine that is capable of reading instructions from a computer-readable medium and executes them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in various figures, such as various servers and devices shown in FIG. 1A, various engines and modules shown in FIG. 2. While FIG. 9 shows various hardware and software elements, each of the components described in FIG. 1A may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 900 may also include a memory 904 that stores computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 902 and reduces the space required for the memory 904. For example, the machine learning methods described herein reduces the complexity of the computation of the processors 902 by applying one or more novel techniques that simplify the steps in training, reaching convergence, and generating results of the processors 902. The algorithms described herein also reduces the size of the models and datasets to reduce the storage space requirement for memory 904.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or another pointing instrument), a storage unit 916 (a hard drive, a solid state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system, comprising:
a user interface rendered by a software application configured to receive, from a domain owner, one or more policies defining authorization of one or more named entity devices that are associated with a domain owned by the domain owner;
a namespace server comprising memory and one or more processors, the namespace server delegated by the domain owner to respond one or more queries on behalf of the domain owner, and wherein the memory comprises instructions that when executed by the one or more processors cause the one or more processors to:
generate a namespace record based on the one or more policies, the namespace record being a record that provides authorization information to inquirers on how communications related to named entity devices that are associated with the domain should be handled;
publish the namespace record, on behalf of the domain owner, at a namespace location associated with the domain owner;
receive a namespace query from a policy consuming device that receives a message from a named entity device that is associated with the domain, wherein the namespace query is directed to the namespace location; and
return, on behalf of the domain owner, the namespace record to the policy consuming device, wherein the namespace record provides the authorization information related to whether the named entity device authorized to communicate with the policy consuming device.

2. The system of claim 1, wherein the named entity device has an identity identifier stored on the domain of the domain owner.

3. The system of claim 1, wherein the authorization information comprises an interaction control list.

4. The system of claim 1, wherein the namespace server is a domain name system (DNS) server and the namespace record is a DNS record.

5. The system of claim 1, wherein the namespace record is in a format that is standardized in an application environment associated with the one or more policies.

6. The system of claim 1, wherein one of the policies includes a contextual constraint related to contextual information of the communication between the policy consuming device and the named entity device.

7. The system of claim 6, wherein the contextual constraint is associated with a geographical location of the policy consuming device or the named entity device.

8. The system of claim 1, wherein an identity of the named entity device has been authenticated by the policy consuming device before the authorization query is received.

9. The system of claim 1, wherein the instruction to return, on behalf of the domain owner, the namespace record to the policy consuming device includes instructions to determine a role of the named entity device specified in the one or more policies.

10. A computer-implemented method, comprising:
receiving, from a domain owner, one or more policies defining authorization of one or more named entity devices that are associated with a domain owned by the domain owner;
generating a namespace record based on the one or more policies, the namespace record being a record that provides authorization information to inquirers on how communications related to named entity devices that are associated with the domain should be handled;
publishing the namespace record, on behalf of the domain owner, at a namespace location associated with the domain owner;
receiving a namespace query from a policy consuming device that receives a message from a named entity device that is associated with the domain, wherein the namespace query is directed to the namespace location; and
returning, by a namespace server delegated by the domain owner to respond one or more queries on behalf of the domain owner, the namespace record to the policy consuming device, wherein the namespace record provides the authorization information related to whether the named entity device authorized to communicate with the policy consuming device.

11. The computer-implemented method of claim 10, wherein the named entity device has an identity identifier stored on the domain of the domain owner.

12. The computer-implemented method of claim 10, wherein the authorization information comprises an interaction control list.

13. The computer-implemented method of claim 10, wherein the namespace server is a domain name system (DNS) server and the namespace record is a DNS record.

14. The computer-implemented method of claim 10, wherein the namespace record is in a format that is standardized in an application environment associated with the one or more policies.

15. The computer-implemented method of claim 10, wherein one of the policies includes a contextual constraint related to contextual information of the communication between the policy consuming device and the named entity device.

16. The computer-implemented method of claim 15, wherein the contextual constraint is associated with a geographical location of the policy consuming device or the named entity device.

17. The computer-implemented method of claim 10, wherein an identity of the named entity device has been authenticated by the policy consuming device before the authorization query is received.

18. The computer-implemented method of claim 10, wherein returning, on behalf of the domain owner, the namespace record to the policy consuming device comprises determining a role of the named entity device specified in the one or more policies.

19. A non-transitory computer readable medium for storing computer code comprising instructions, the instructions, when executed by one or more processors, cause the one or more processors to at least:
receive, from a domain owner, one or more policies defining authorization of one or more named entity devices that are associated with a domain owned by the domain owner;
generate a namespace record based on the one or more policies, the namespace record being a record that provides authorization information to inquirers on how communications related to named entity devices that are associated with the domain should be handled;

publish the namespace record, on behalf of the domain owner, at a namespace location associated with the domain owner;

receive a namespace query from a policy consuming device that receives a message from a named entity device that is associated with the domain, wherein the namespace query is directed to the namespace location; and return, by a namespace server delegated by the domain owner to respond one or more queries on behalf of the domain owner, the namespace record to the policy consuming device, wherein the namespace record provides the authorization information related to whether the named entity device authorized to communicate with the policy consuming device.

20. The non-transitory computer readable medium of claim 19, wherein the named entity device has an identity identifier stored on the domain of the domain owner.

* * * * *